United States Patent
Li et al.

(10) Patent No.: US 11,854,249 B2
(45) Date of Patent: Dec. 26, 2023

(54) CHARACTER RECOGNITION METHOD AND TERMINAL DEVICE

(71) Applicant: BOE TECHNOLOGY GROUP CO., LTD., Beijing (CN)

(72) Inventors: Yue Li, Beijing (CN); Jibo Zhao, Beijing (CN); Guangwei Huang, Beijing (CN); Ruibin Xue, Beijing (CN); Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 386 days.

(21) Appl. No.: 17/420,114

(22) PCT Filed: Sep. 7, 2020

(86) PCT No.: PCT/CN2020/113843
§ 371 (c)(1),
(2) Date: Jun. 30, 2021

(87) PCT Pub. No.: WO2021/047484
PCT Pub. Date: Mar. 18, 2021

(65) Prior Publication Data
US 2022/0058422 A1 Feb. 24, 2022

(30) Foreign Application Priority Data

Sep. 12, 2019 (CN) .......................... 201910863520.8

(51) Int. Cl.
*G06V 10/00* (2022.01)
*G06V 10/82* (2022.01)
(Continued)

(52) U.S. Cl.
CPC ............ *G06V 10/82* (2022.01); *G06F 18/214* (2023.01); *G06N 3/045* (2023.01); *G06V 20/62* (2022.01); *G06V 30/10* (2022.01); *G06V 30/41* (2022.01)

(58) Field of Classification Search
CPC ........ G06V 10/82; G06V 20/62; G06V 30/10; G06V 30/41; G06V 30/413; G06F 18/214; G06N 3/045; G06N 3/08
See application file for complete search history.

(56) References Cited

U.S. PATENT DOCUMENTS 10,262,235 B1 * 4/2019 Chen ...................... G06N 3/044
2019/0294874 A1 * 9/2019 Orlov ..................... G06N 3/084
(Continued)

*Primary Examiner* — Ping Y Hsieh
(74) *Attorney, Agent, or Firm* — IP & T GROUP LLP

(57) ABSTRACT

A character recognition method includes: performing feature extraction on an image to be recognized to obtain a first feature map; processing the first feature map to at least obtain N first candidate carrier detection boxes, each first candidate carrier detection box being configured to outline a region of a character carrier; screening the N first candidate carrier detection boxes to obtain K first target carrier detection boxes; performing a feature extraction on the first feature map to obtain a second feature map; processing the second feature map to obtain L first candidate character detection boxes, each first candidate character detection box being configured to outline a region containing at least one character; screening the L first candidate character detection boxes to obtain J first target character detection boxes; and recognizing characters in the J first target character detection boxes to obtain J target character informations.

18 Claims, 12 Drawing Sheets

(51) Int. Cl.
  *G06V 30/10* (2022.01)
  *G06F 18/214* (2023.01)
  *G06N 3/045* (2023.01)
  *G06V 30/41* (2022.01)
  *G06V 20/62* (2022.01)

(56) References Cited

U.S. PATENT DOCUMENTS

2021/0034856 A1\* 2/2021 Torres ................... G06V 30/414
2021/0073323 A1\* 3/2021 Fisher ................... G06F 40/109

\* cited by examiner

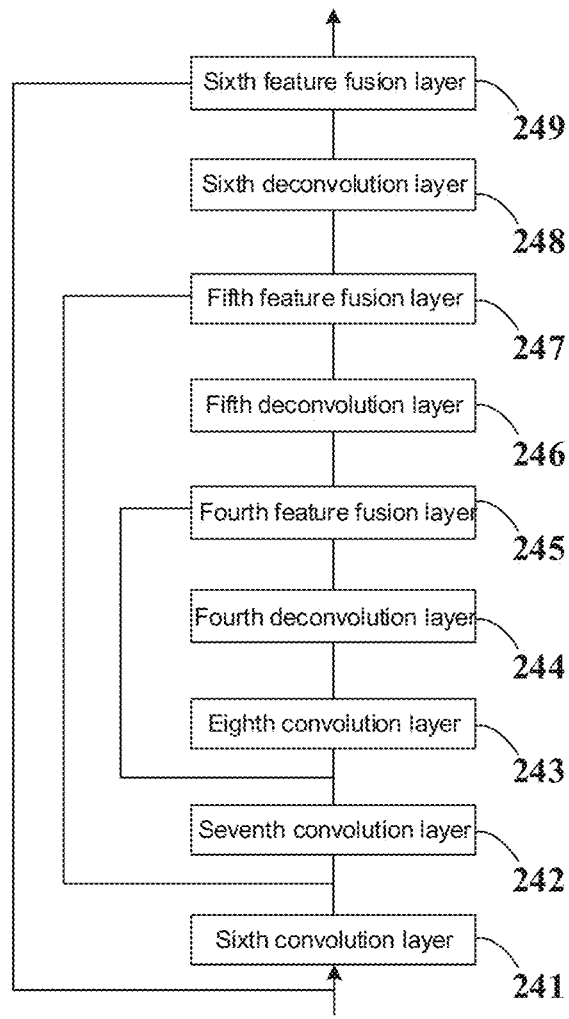

For each first candidate character detection box, obtain second overlap areas of the first candidate character detection box and the K first target carrier detection boxes by utilizing the character detection network, so as to obtain K second overlap areas

2062

If the character detection network judges that at least one of the K second overlap areas is greater than or equal to a preset second overlap area threshold, determine the first candidate character detection box as one first target character detection box

FIG. 11

CHARACTER RECOGNITION METHOD AND TERMINAL DEVICE

CROSS-REFERENCE TO RELATED APPLICATIONS

This application is a national phase entry under 35 USC 371 of International Patent Application No. PCT/CN2020/113843, filed on Sep. 7, 2020, which claims priority to Chinese Patent Application No. 201910863520.8, filed on Sep. 12, 2019 and entitled "CHARACTER RECOGNITION METHOD AND TERMINAL DEVICE", which are incorporated herein by reference in their entirety.

TECHNICAL FIELD

This present disclosure relates to the field of image processing technologies, and in particular, to a character recognition method and a terminal device.

BACKGROUND

The recognition of character(s) on a character carrier is mostly based on following processes. An edge of the character carrier is firstly extracted by a straight line detection to reduce background interference. Then the character carrier is clipped, and the character(s) on the character carrier are detected and recognized.

SUMMARY

In a first aspect, a character recognition method is provided. The method includes: performing a feature extraction on an image to be recognized to obtain a first feature map, the image to be recognized including at least one character and at least one character carrier, and the first feature map carrying features of the at least one character carrier and the at least one character; processing the first feature map to at least obtain N first candidate carrier detection boxes, each first candidate carrier detection box being configured to outline a region of a character carrier in the at least one character carrier, and N being a positive integer; screening the N first candidate carrier detection boxes to obtain K first target carrier detection boxes, K being a positive integer, and K being less than or equal to N; performing a feature extraction on the first feature map to obtain a second feature map, the second feature map carrying at least one feature of at least one character; processing the second feature map to obtain L first candidate character detection boxes, each first candidate character detection box being configured to outline a region containing at least one character, and L being a positive integer; screening the L first candidate character detection boxes to obtain J first target character detection boxes according to the K first target carrier detection boxes, J being a positive integer, and J being less than or equal to L; and recognizing characters in the J first target character detection boxes to obtain J target character informations.

In some embodiments, the character recognition method further includes: according to respective positions of the J first target character detection boxes in the K first target carrier detection boxes, the J target character informations, and respective positions of the K first target carrier detection boxes in the image to be recognized, obtaining K recognition results. Each recognition result includes target character informations in all first target character detection boxes that are located in a same first target carrier detection box.

In some embodiments, processing the first feature map to at least obtain the N first candidate carrier detection boxes, includes: processing the first feature map to obtain the N first candidate carrier detection boxes and M first character detection boxes. Each first character detection box is configured to outline a region containing at least one character, and M is a positive integer. Screening the N first candidate carrier detection boxes to obtain the K first target carrier detection boxes, includes: for each first candidate carrier detection box, obtaining first overlap areas of the first candidate carrier detection box and the M first character detection boxes, so as to obtain M first overlap areas; determining whether at least one of the M first overlap areas is greater than or equal to a preset first overlap area threshold, and in response to determining that at least one of the M first overlap areas is greater than or equal to the preset first overlap area threshold, determining the first candidate carrier detection box as one first target carrier detection box.

In some embodiments, screening the L first candidate character detection boxes to obtain the J first target character detection boxes according to the K first target carrier detection boxes, includes: for each first candidate character detection box, obtaining second overlap areas of the first candidate character detection box and the K first target carrier detection boxes, so as to obtain K second overlap areas; determining whether at least one of the K second overlap areas is greater than or equal to a preset second overlap area threshold, and in response to determining that at least one of the K second overlap areas is greater than or equal to the preset second overlap area threshold, determining the first candidate character detection box as one first target character detection box.

In some embodiments, recognizing the characters in the J first target character detection boxes to obtain the J target character informations, includes: according to position informations of the J first target character detection boxes, extracting J first target character regions from the image to be recognized, so as to obtain J first character images; for each first character image, determining whether a direction of a designated edge of the first character image is inclined relative to a reference direction, and in response to determining that the direction of the designated edge of the first character image is inclined relative to the reference direction, adjusting an angle of the first character image, so as to make the designated edge of the first character image extend along the reference direction; recognizing characters in the J first character images with designated edges all extend along the reference direction, so as to obtain the J target character informations.

In a second aspect, a character recognition method is provided, which performs a character recognition based on a character recognition neural network. The character recognition neural network includes a first feature extraction network, a carrier and character detection network, a carrier screening layer, a second feature extraction network, a character detection network, and a character recognition network. The method includes: performing a feature extraction on an image to be recognized by utilizing the first feature extraction network, so as to obtain a first feature map, the image to be recognized including at least one character and at least one character carrier, and the first feature map carrying features of the at least one character carrier and the at least one character; processing the first feature map by utilizing the carrier and character detection network, so as to at least obtain N first candidate carrier detection boxes, each first candidate carrier detection box being configured to outline a region of a character carrier in the at least one character carrier, and N being a positive integer; screening the N first candidate carrier detection boxes by utilizing the carrier screening layer, so as to obtain K first target carrier detection boxes, K being a positive integer, and K being less than or equal to N; performing a feature extraction on the first feature map by utilizing the second feature extraction network, so as to obtain a second feature map, the second feature map carrying at least one feature of at least one character; processing the second feature map by utilizing the character detection network, so as to obtain L first candidate character detection boxes, each first candidate character detection box being configured to outline a region containing at least one character, and L being a positive integer; screening the L first candidate character detection boxes by utilizing the character detection network according to the K first target carrier detection boxes, so as to obtain J first target character detection boxes, J being a positive integer, and J being less than or equal to L; and recognizing characters in the J first target character detection boxes by utilizing the character recognition network, so as to obtain J target character informations.

In some embodiments, the character recognition neural network further includes an output layer. The method further includes: according to respective positions of the J first target character detection boxes in the K first target carrier detection boxes, the J target character informations, and respective positions of the K first target carrier detection boxes in the image to be recognized, obtaining K recognition results by utilizing the output layer. Each recognition result includes target character informations in all first target character detection boxes that are located in a same first target carrier detection box.

In some embodiments, processing the first feature map by utilizing the carrier and character detection network, so as to at least obtain the N first candidate carrier detection boxes, includes: processing the first feature map by utilizing the carrier and character detection network, so as to obtain the N first candidate carrier detection boxes and M first character detection boxes. Each first character detection box is configured to outline a region containing at least one character, and M is a positive integer. Screening the N first candidate carrier detection boxes by utilizing the carrier screening layer, so as to obtain the K first target carrier detection boxes, includes: for each first candidate carrier detection box, obtaining first overlap areas of the first candidate carrier detection box and the M first character detection boxes by utilizing the carrier screening layer, so as to obtain M first overlap areas; if the carrier screening layer judges that at least one of the M first overlap areas is greater than or equal to a preset first overlap area threshold, determining the first candidate carrier detection box as one first target carrier detection box.

In some embodiments, screening the L first candidate character detection boxes by utilizing the character detection network according to the K first target carrier detection boxes, so as to obtain the J first target character detection boxes, includes: for each first candidate character detection box, obtaining second overlap areas of the first candidate character detection box and the K first target carrier detection boxes by utilizing the character detection network, so as to obtain K second overlap areas; if the character detection network judges that at least one of the K second overlap areas is greater than or equal to a preset second overlap area threshold, determining the first candidate character detection box as one first target character detection box.

In some embodiments, the character recognition neural network further includes an angle adjustment network. The method further includes: according to position informations of the J first target character detection boxes, extracting J first target character regions from the image to be recognized by utilizing the angle adjustment network, so as to obtain J first character images; for each first character image, if the angle adjustment network judges that a direction of a designated edge of the first character image is inclined relative to a reference direction, adjusting an angle of the first character image, so as to make the designated edge of the first character image extend along the reference direction. Recognizing the characters in the J first target character detection boxes by utilizing the character recognition network, so as to obtain the J target character informations, includes: obtaining the J first character images with designated edges all extend along the reference direction from the angle adjustment network by utilizing the character recognition network, and recognizing characters in the J first character images, so as to obtain the J target character informations.

In some embodiments, the first feature extraction network and the carrier and character detection network are obtained through following training steps: inputting a first training sample into a first feature extraction network to be trained, the first training sample including at least one character and at least one character carrier, and carrying a first label, and the first label including a first carrier labeling information of the at least one character carrier and a first character labeling information of the at least one character; performing, by the first feature extraction network to be trained, a feature extraction on the first training sample, and determining, by a carrier and character detection network to be trained, a first carrier prediction information of the at least one character carrier and a first character prediction information of the at least one character in the first training sample according to features extracted by the first feature extraction network to be trained; obtaining a first comparison result of the first carrier prediction information and the first carrier labeling information and a second comparison result of the first character prediction information and the first character labeling information; adjusting network parameters of the first feature extraction network to be trained and network parameters of the carrier and character detection network to be trained according to the first comparison result and the second comparison result, so as to obtain the first feature extraction network and the carrier and character detection network.

In some embodiments, the second feature extraction network and the character detection network are obtained through following training steps: inputting a second training sample into the first feature extraction network, the second training sample including at least one character, and carrying a second label, and the second label including a second character labeling information of the at least one character; performing, by the first feature extraction network, a feature extraction on the second training sample, so as to obtain a third feature map; performing, by a second feature extraction network to be trained, a feature extraction on the third feature map, and determining, by a character detection network to be trained, a second character prediction information of the at least one character in the second training sample according to features extracted by the second feature extraction network to be trained; obtaining a third comparison result of the second character prediction information and the second character labeling information; adjusting network parameters of the second feature extraction network to be trained and network parameters of the character detection network to be trained according to the third comparison result, so as to obtain the second feature extraction network and the character detection network.

In some embodiments, the character recognition network is obtained through following training steps: inputting a third training sample into the first feature extraction network, the third training sample including at least one character, and carrying a third label, and the third label including a third character labeling information of the at least one character; performing, by the first feature extraction network, a feature extraction on the third training sample, so as to obtain a fourth feature map; performing, by the second feature extraction network, a feature extraction on the fourth feature map, so as to obtain a fifth feature map; processing, by the character detection network, the fifth feature map to obtain at least one second character detection box of the at least one character, each second character detection box being configured to outline a region containing at least one character; recognizing, by a character recognition network to be trained, the at least one character in the at least one second character detection box, so as to obtain a third character prediction information; obtaining a fourth comparison result of the third character prediction information and the third character labeling information; adjusting network parameters of the character recognition network to be trained according to the fourth comparison result, so as to obtain the character recognition network.

In some embodiments, the character recognition neural network is obtained through following training steps: inputting a fourth training sample into the first feature extraction network, the fourth training sample including at least one character and at least one character carrier, and carrying a fourth label, and the fourth label including a second carrier labeling information of the at least one character carrier and a fourth character labeling information of the at least one character; performing, by the first feature extraction network, a feature extraction on the fourth training sample, so as to obtain a sixth feature map, the sixth feature map carrying features of the at least one character carrier and the at least one character; processing, by the carrier and character detection network, the sixth feature map, so as to at least obtain n second candidate carrier detection boxes, each second candidate carrier detection box being configured to outline a region of a character carrier in the at least one character carrier, and n being a positive integer, and determining, by the carrier and character detection network, a second carrier prediction information of the character carrier; screening, by the carrier screening layer, the n second candidate carrier detection boxes, so as to obtain t second target carrier detection boxes, t being a positive integer, and t being less than or equal to n; performing, by the second feature extraction network, a feature extraction on the sixth feature map to obtain a seventh feature map, the seventh feature map carrying at least one feature of at least one character; processing, by the character detection network, the seventh feature map to obtain p second candidate character detection boxes, each second candidate character detection box being configured to outline a region containing at least one character, and p being a positive integer; screening, by the character detection network, the p second candidate character detection boxes according to the t second target carrier detection boxes, so as to obtain j second target character detection boxes, j being a positive integer, and j being less than or equal to p; recognizing, by the character recognition network, characters in the j second target character detection boxes, so as to obtain a fourth character prediction information; obtaining a fifth comparison result of the second carrier prediction information and the second carrier labeling information, and a sixth comparison result of the fourth character prediction information and the fourth character labeling information; adjusting network parameters of a character recognition neural network to be trained according to the fifth comparison result and the sixth comparison result, so as to obtain the character recognition neural network.

In a third aspect, a terminal device is provided. The terminal device includes at least one processor and a memory. The memory is configured to store computer programs. The at least one processor is configured to execute the computer programs stored in the memory, so as to implement the method in the first aspect.

In a fourth aspect, a non-transitory computer-readable storage medium is provided. The non-transitory computer-readable storage medium stores computer programs. When the computer programs are executed by at least one processor, the method in the first aspect is implemented.

In a fifth aspect, a terminal device is provided. The terminal device includes at least one processor and a memory. The memory is configured to store program instructions of a character recognition neural network. The at least one processor is configured to execute the program instructions stored in the memory, so as to implement the method in the second aspect.

In a sixth aspect, a non-transitory computer-readable storage medium is provided. The non-transitory computer-readable storage medium stores program instructions of a character recognition neural network. When the program instructions are executed by at least one processor, the method in the second aspect is implemented.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product, an actual process of a method and an actual timing of a signal involved in the embodiments of the present disclosure.

FIG. 10 is a structural block diagram of a second feature extraction network, in accordance with some embodiments of the present disclosure;

FIG. 11 is a flowchart of Step 206, in accordance with some embodiments of the present disclosure;

DETAILED DESCRIPTION

Figure 1:
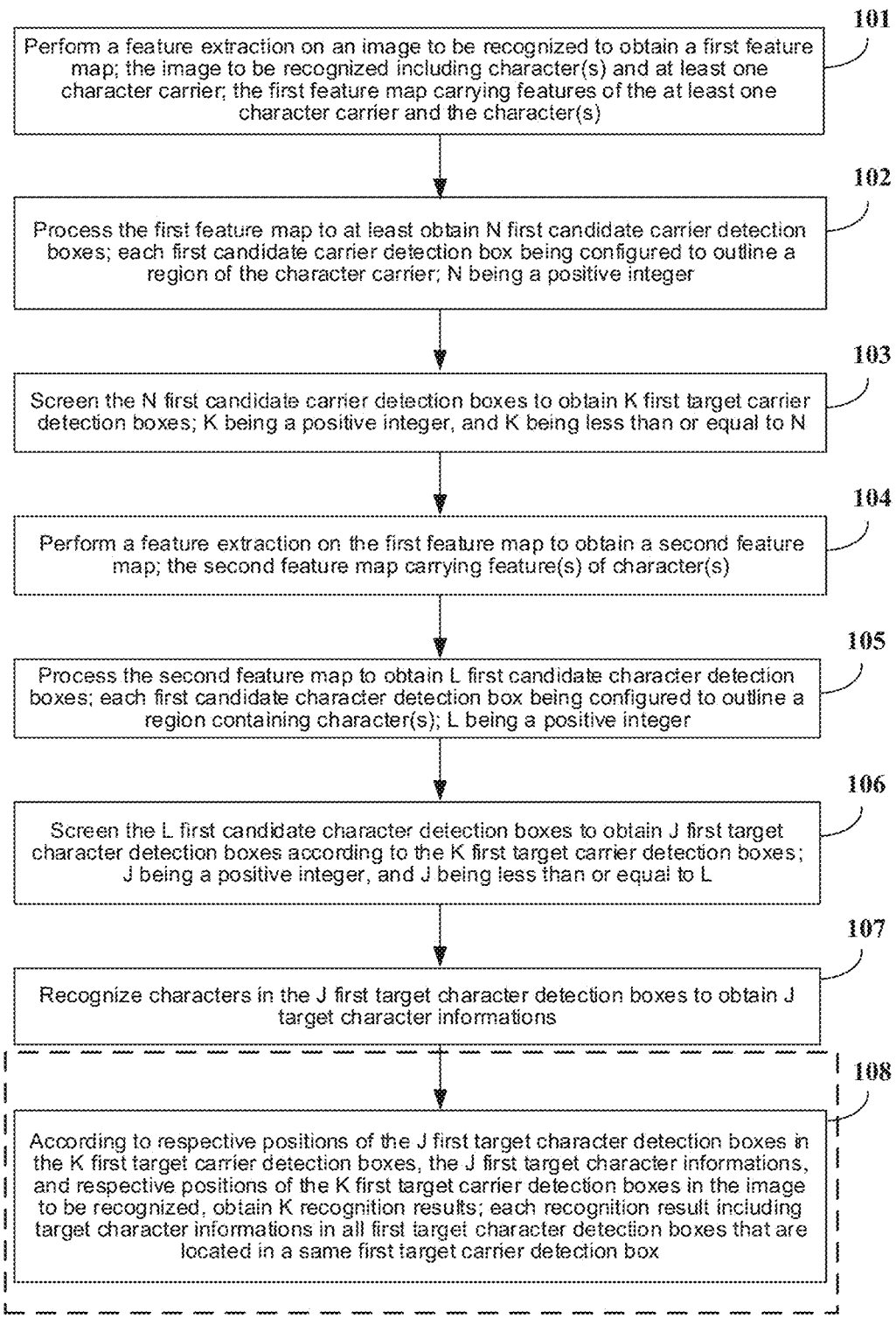
FIG. 1 is a flowchart of a character recognition method, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive meanings, i.e., "including, but not limited to". In the description of the specification, the terms such as "one embodiment", "some embodiments", "exemplary embodiments", "an example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms such as "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the term "connected" and its derivatives may be used. For example, the term "connected" may be used in the description of some embodiments to indicate that two or more components are in direct physical contact or electrical contact with each other. The embodiments disclosed herein are not necessarily limited to the contents herein.

As used herein, the term "if" is, optionally, construed as "when" or "in a case where" or "in response to determining" or "in response to detecting", depending on the context. Similarly, the phrase "if . . . judges . . . " is, optionally, construed to mean "when . . . judges . . . " or "in response to judging . . . ", depending on the context.

The use of "configured to" herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values other than those stated.

The character recognition method, based on the steps of extracting the edge of the character carrier, clipping the character carrier, and detecting and recognizing the character(s) on the character carrier, can only recognize a character information on one character carrier at a time, i.e., cannot accurately recognize and distinguish character informations on a plurality of character carriers, and has a low recognition efficiency. In addition, due to the background interference, extracting the edge of the character carrier by the straight line detection results in a high error rate.

Based on this, in some embodiments of the present disclosure, a character recognition method is provided. The character recognition method may be applied to a terminal device, and the terminal device may be a smart phone, a tablet computer, a personal computer, a server, or the like.

In some embodiments, as shown in FIG. 1, the character recognition method includes Steps 101 to 107.

In Step 101, one or more processors are used to perform a feature extraction on an image to be recognized, so as to obtain a first feature map. The image to be recognized includes character(s) and at least one character carrier. The first feature map carries features of the at least one character carrier and the character(s).

In some examples, the image to be recognized includes the character(s) and the at least one character carrier. The character carrier may be a business card, or a bill, but is not limited thereto. The bill may be a ticket to ride, an entrance ticket, a movie ticket, or an invoice, but is not limited thereto.

Figure 2:
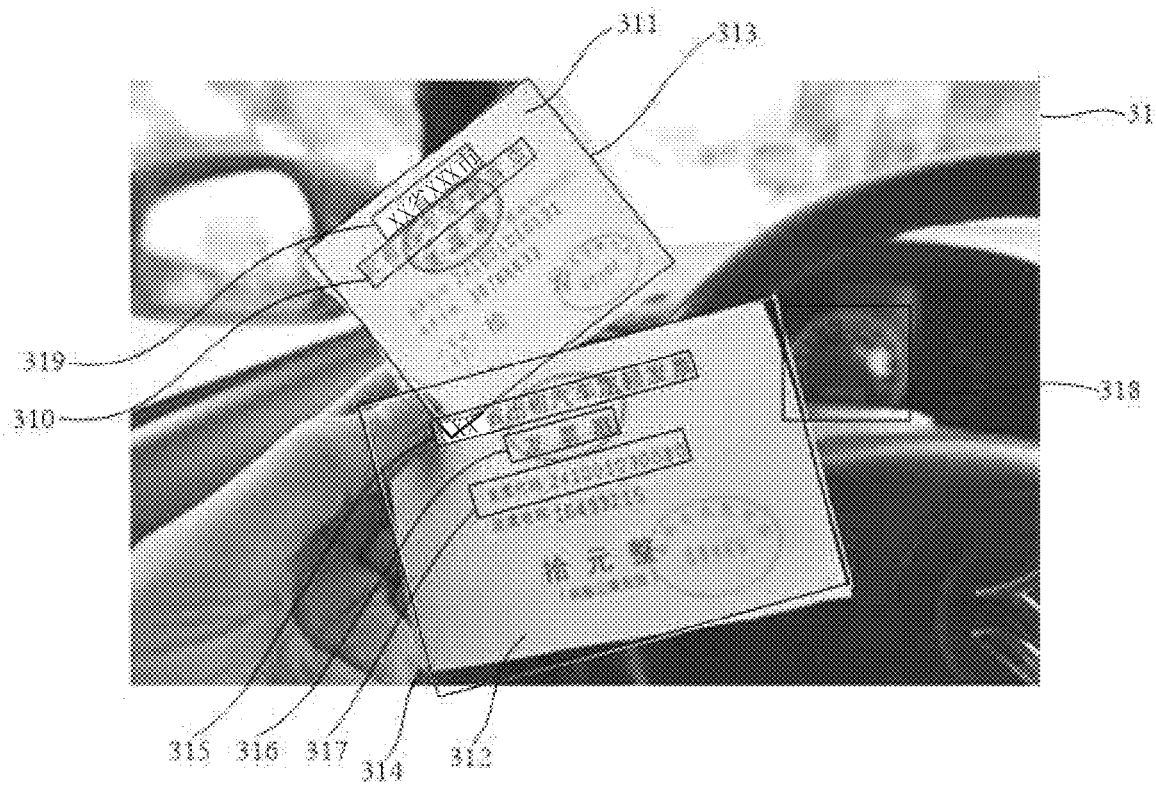
FIG. 2 is a schematic diagram of an image to be recognized, in accordance with some embodiments of the present disclosure.

For example, as shown in FIG. 2, the image to be recognized 31 includes a first character carrier 311 and characters on the first character carrier 311, and a second character carrier 312 and characters on the second character carrier 312. The first character carrier 311 may be a ticket to ride, e.g., xx省 xxx市出租汽 车定额客票 (Taxi Quota Ticket in XXX City, XX Province), and the second character carrier 312 may be an invoice, e.g., xx 省出租汽 车定额发票 (Taxi Quota Ticket in XX Province).

In some examples, when character(s) on at least one character carrier are required to be recognized, an image including the at least one character carrier is captured by an imaging apparatus, so as to obtain the image to be recognized. The imaging apparatus may be mounted on the terminal device, but is not limited thereto.

In Step 102, one or more processors are used to process the first feature map, so as to at least obtain N first candidate carrier detection boxes. Each first candidate carrier detection box is configured to outline a region of the character carrier, and N is a positive integer.

In some examples, using one or more processors to process the first feature map, so as to at least obtain the N first candidate carrier detection boxes, includes: using one or more processors to process the first feature map, so as to obtain the N first candidate carrier detection boxes and M first character detection boxes. Each first character detection box is configured to outline a region containing character(s), and M is a positive integer.

For example, one or more processors use a Region Propose Network (RPN) method in an algorithm of Towards Real-Time Object Detection with Region Proposal Networks (Faster R-CNN) to process the first feature map, so as to obtain the N first candidate carrier detection boxes and the M first character detection boxes. Each first character detection box may include a row of characters with a character spacing of less than a preset first character spacing threshold. It will be noted that the method for the processor(s) to process the first feature map is not limited to the RPN method.

In the above examples, the image to be recognized 31 further includes character(s) on a background of the image to be recognized 31. As shown in FIG. 2, one or more processors are used to process the first feature map obtained after Step 1 is executed, and three first candidate carrier detection boxes and five first character detection boxes are obtained. The three first candidate carrier detection boxes are a first candidate carrier detection box 313 corresponding to the first character carrier 311, a first candidate carrier detection box 314 corresponding to the second character carrier 312, and a first candidate carrier detection box 318 obtained from the background of the image to be recognized 31, respectively. The five first character detection boxes are a first character detection box 315, a first character detection box 316, and a first character detection box 317 that are located on the second character carrier 312, and a first character detection box 319 and a first character detection box 310 that are located on the first character carrier 311, respectively. Here, N is three, and M is five. Of course, N may also be other positive integer such as one, two, or four, and M may also be other positive integer such as one, two, three, or four.

It can be seen that when the processor(s) process the first feature map, due to background interference of the image to be recognized 31, the first candidate carrier detection box 318 is detected by mistake, and character(s) in the first candidate carrier detection box 318 affect results of the character recognition. Therefore, the N first candidate carrier detection boxes are required to be screened, so as to exclude the character(s) on the background of the image to be recognized.

In Step 103, one or more processors are used to screen the N first candidate carrier detection boxes, so as to obtain K first target carrier detection boxes, K is a positive integer, and K is less than or equal to N.

Figure 3:
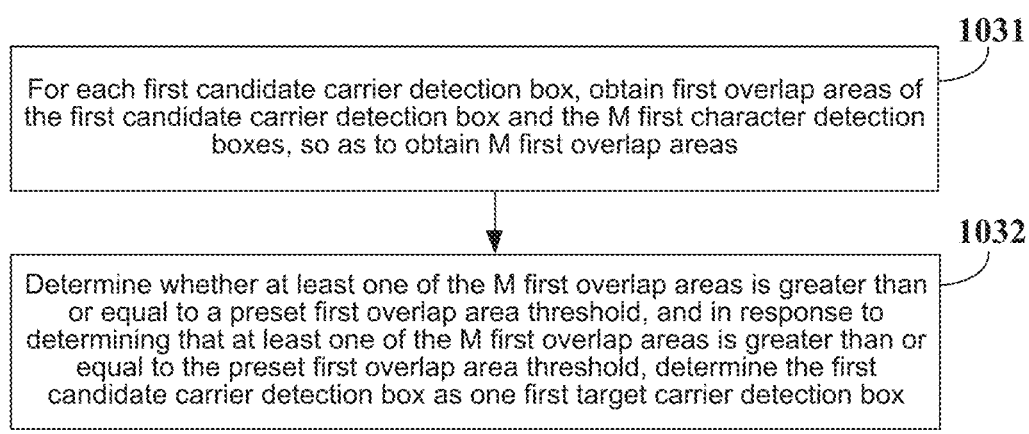
FIG. 3 is a flowchart of Step 103, in accordance with some embodiments of the present disclosure.

In some examples, as shown in FIG. 3, using one or more processors to screen the N first candidate carrier detection boxes, so as to obtain the K first target carrier detection boxes, includes Steps 1031 and 1032.

In Step 1031, for each first candidate carrier detection box, one or more processors are used to obtain first overlap areas of the first candidate carrier detection box and the M first character detection boxes, so as to obtain M first overlap areas.

In Step 1032, if the processor(s) judge that at least one of the M first overlap areas is greater than or equal to a preset first overlap area threshold, the first candidate carrier detection box is determined as the first target carrier detection box.

In the above examples, for the first candidate carrier detection box 313, one or more processors are used to obtain the first overlap areas of the first candidate carrier detection box 313 with the first character detection box 315, the first character detection box 316, the first character detection box 317, the first character detection box 319, the first character detection box 310, and five first overlap areas are obtained. If the processor(s) judge that at least one of the five first overlap areas is greater than or equal to the preset first overlap area threshold S10, the first candidate carrier detection box 313 is determined as the first target carrier detection box. In other words, if the processor(s) judge that the five first overlap areas are all less than the first overlap area threshold S10, the first candidate carrier detection box 313 is determined not to be the first target carrier detection box. For example, after the judgment of the processor(s), the first overlap area of the first candidate carrier detection box 313 and the first character detection box 319 is greater than the first overlap area threshold S10. Therefore, the first candidate carrier detection box 313 may be determined as the first target carrier detection box.

Similarly, for the first candidate carrier detection box 314, one or more processors are used to obtain the first overlap areas of the first candidate carrier detection box 314 with the first character detection box 315, the first character detection box 316, the first character detection box 317, the first character detection box 319, the first character detection box 310, and another five first overlap areas are obtained. After the judgment of the processor(s), at least one of the another five first overlap areas is greater than or equal to the preset first overlap area threshold S10. For example, the first overlap area of the first candidate carrier detection box 314 and the first character detection box 315, and the first overlap area of the first candidate carrier detection box 314 and the first character detection box 317, are greater than the first overlap area threshold S10. Therefore, the first candidate carrier detection box 314 may be determined as the first target carrier detection box.

Similarly, for the first candidate carrier detection box 318, one or more processors are used to obtain the first overlap areas of the first candidate carrier detection box 318 with the first character detection box 315, the first character detection box 316, the first character detection box 317, the first character detection box 319, the first character detection box 310, and yet another five first overlap areas are obtained. After the judgment of the processor(s), the yet another five first overlap areas are all less than the first overlap area threshold S10. Therefore, the first candidate carrier detection box 318 is determined not to be the first target carrier detection box.

That is, in the above examples, after one or more processors are used to screen the three first candidate carrier detection boxes, two first target carrier detection boxes, i.e., the first target carrier detection box 313 and the first target carrier detection box 314, are obtained.

In Step 104, one or more processors are used to perform a feature extraction on the first feature map, so as to obtain a second feature map. The second feature map carries feature(s) of character(s).

It will be noted that after Step 103, the K first target carrier detection boxes are screened out from the N first candidate carrier detection boxes. That is, the character(s) on the background of the image to be recognized are excluded. Therefore, the feature(s) of the character(s) carried in the second feature map refer to the feature(s) of the character(s) on the character carrier(s).

In Step 105, one or more processors are used to process the second feature map, so as to obtain L first candidate character detection boxes. Each first candidate character detection box is configured to outline a region containing character(s), and L is a positive integer.

In some examples, each first candidate character detection box may include a row of characters with a character spacing of less than a preset second character spacing threshold. Here, L is less than or equal to M.

In Step 106, one or more processors screen the L first candidate character detection boxes according to the K first target carrier detection boxes, so as to obtain J first target character detection boxes, J is a positive integer, and J is less than or equal to L.

Figure 4:
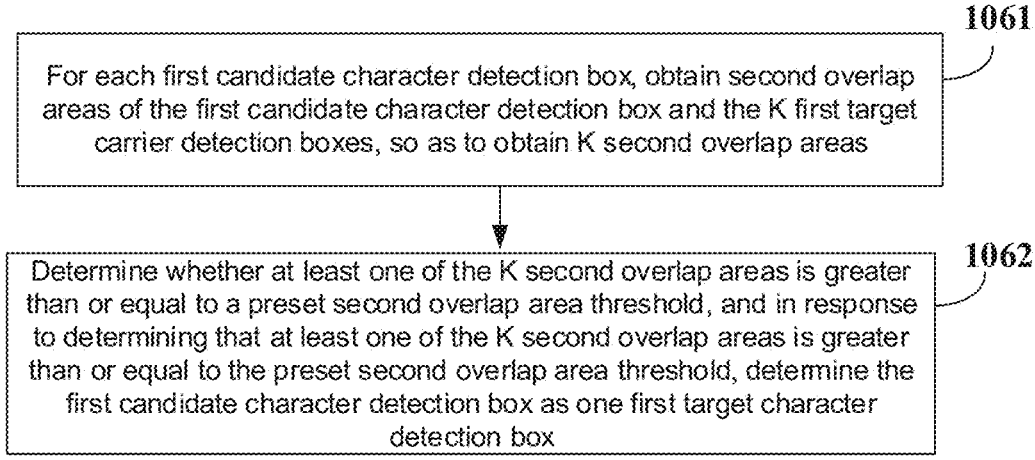
FIG. 4 is a flowchart of Step 106, in accordance with some embodiments of the present disclosure.

In some examples, as shown in FIG. 4, one or more processors screening the L first candidate character detection boxes according to the K first target carrier detection boxes, so as to obtain the J first target character detection boxes, includes Steps 1061 and 1062.

In Step 1061, for each first candidate character detection box, one or more processors are used to obtain second overlap areas of the first candidate character detection box and the K first target carrier detection boxes, so as to obtain K second overlap areas.

In Step 1062, if the processor(s) judge that at least one of the K second overlap areas is greater than or equal to a preset second overlap area threshold, the first candidate character detection box is determined as the first target character detection box.

That is, for each first candidate character detection box, one or more processors are used to obtain the second overlap areas of the first candidate character detection box and the K first target carrier detection boxes, so as to obtain the K second overlap areas. If the processor(s) judge that at least one of the K second overlap areas is greater than or equal to the preset second overlap area threshold, the first candidate character detection box is determined as the first target character detection box. In other words, if the processor(s) judge that the K second overlap areas are all less than the preset second overlap area threshold, the first candidate character detection box is determined not to be the first target character detection box, and then the processor(s) delete the first candidate character detection box. It can be seen from Step 1061 and step 1062 that the method of screening the L first candidate character detection boxes here is similar to the method of screening the N first candidate carrier detection boxes in Step 103, which will not be repeated here.

In Step 107, one or more processors are used to recognize characters in the J first target character detection boxes, so as to obtain J target character informations.

Figure 5:
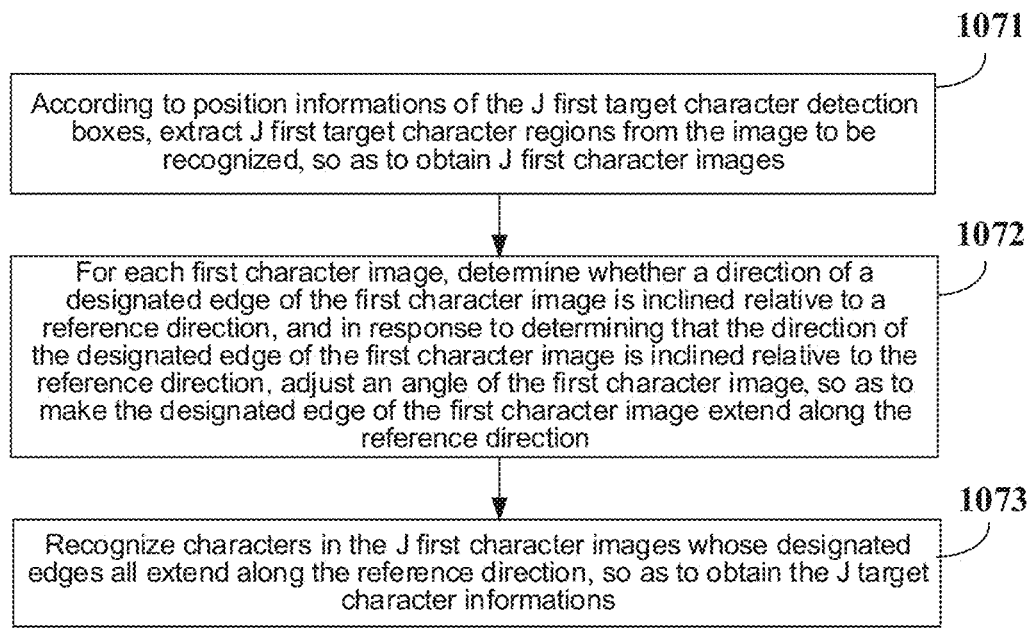
FIG. 5 is a flowchart of Step 107, in accordance with some embodiments of the present disclosure.

In some examples, as shown in FIG. 5, using one or more processors to recognize the characters in the J first target character detection boxes, so as to obtain the J target character informations, includes Steps 1071 to 1073.

In Step 1071, one or more processors extract J first target character regions from the image to be recognized according to position informations of the J first target character detection boxes, so as to obtain J first character images.

If a direction of a designated edge of the first target character detection box is inclined relative to a reference direction (e.g., a horizontal direction), a direction of a designated edge of the first character image extracted according to the position information of the first target character detection box is also inclined relative to the reference direction. Therefore, it is required to adjust an angle of the first character image whose designated edge is inclined relative to the reference direction, so as to obtain the J first character images whose designated edges all extend along the reference direction.

In Step 1072, for each first character image, if the processor(s) judge that the direction of the designated edge of the first character image is inclined relative to the reference direction, the angle of the first character image is adjusted, so as to make the designated edge of the first character image extend along the reference direction.

In a case where each first candidate character detection box includes the row of characters with the character spacing of less than the preset second character spacing threshold, the J first target character detection boxes screened out from the L first candidate character detection boxes each includes a row of characters with a character spacing of less than the preset second character spacing threshold. In this way, the direction of the designated edge of the first character image is, for example, an arrangement direction of the characters. In other words, the designated edge of the first character image is a long side of the first character image.

In Step 1073, the processor(s) recognize the characters in the J first character images whose designated edges all extend along the reference direction, so as to obtain the J target character informations.

For example, considering the five first character detection boxes as the first target character detection boxes in the above examples as an example, the processor(s) obtain the position informations of the five first character detection boxes to obtain five position informations, and extract the areas containing the characters (i.e., the first target character areas) respectively outlined by the first character detection box 315, the first character detection box 316, the first character detection box 317, the first character detection box 319, and the first character detection box 310 from the image to be recognized 31 according to the five position informations, and five first character images are obtained. The long side of each first character image is used as the designated edge thereof, and the horizontal direction is used as the reference direction. As shown in FIG. 3, a direction of the long side of each first character image is inclined relative to the horizontal direction. Then, the processor(s) adjust the angles of the five first character images, so that the long sides of the five first character images all extend along the horizontal direction. Finally, the processor(s) recognize the characters in the five first character images whose long sides all extend along the horizontal direction, and five target character informations are obtained. The five target character informations are, for example, xx 省xxx市 (XXX City in XX Province (the target character information in the first character detection box 319)), 出租汽车定额客票 (Taxi Quota Ticket (the target character information in the first character detection box 310)), xx省出租汽车定额发票 (Taxi Quota Invoice in XX Province (the target character information in the first character detection box 315)), 发票联 (Invoice (the target character information in the first character detection box 316)), and 发票代码 (Invoice Code 241001030080 (the target character information in the first character detection box 317)).

In some other embodiments, as shown in FIG. 1, the character recognition method provided in some embodiments of the present disclosure further includes Step 108.

In Step 108, one or more processors obtain K recognition results according to respective positions of the J first target character detection boxes in the K first target carrier detection boxes, the J target character informations, and respective positions of the K first target carrier detection boxes in the image to be recognized. Each recognition result includes target character informations in all first target character detection boxes that are located in a same first target carrier detection box.

In some examples, the processor(s) obtain the respective positions of the J first target character detection boxes in the K first target carrier detection boxes and the respective positions of the K first target carrier detection boxes in the image to be recognized, and obtain all of the first target character detection boxes that are located in the same first target carrier detection box according to the respective positions of the J first target character detection boxes in the K first target carrier detection boxes and the respective positions of the K first target carrier detection boxes in the image to be recognized. In this way, the recognition result may be obtained according to the target character informations in all of the first target character detection boxes that are located in the same first target carrier detection box.

In the above examples, the first character detection box 315, the first character detection box 316, and the first character detection box 317 are located in the same first target carrier detection box 314. A first recognition result is obtained according to the target character informations in the first character detection box 315, the first character detection box 316, and the first character in the box 317. For example, the first recognition result includes three target character informations, which are xx 省出租汽 车定额发票 (Taxi Quota Invoice in XX Province (the target character information in the first character detection box 315)), 发票联 (Invoice (the target character information in the first character detection box 316)), and 发票代码 241001030080 (Invoice Code 241001030080" (the target character information in the first character detection box 317)).

In addition, the first character detection box 319 and the first character detection box 310 are located in the same first target carrier detection box 313. A second recognition result is obtained according to the target character informations in the first character detection box 319 and the first character detection box 310. For example, the second recognition result includes two target character informations, which are "XXX City in XX Province" (the target character information in the first character detection box 319) and "Taxi Quota Ticket" (the target character information in the first character detection box 310), respectively.

In the character recognition method provided in some embodiments of the present disclosure, one or more processors are used to perform the feature extraction on the image to be recognized to obtain the first feature map, and then process the first feature map to at least obtain the N first candidate carrier detection boxes, and then screen the N first candidate carrier detection boxes to obtain the K first target carrier detection boxes. In this way, an interference of character(s) on a non-character carrier to the recognition results may be excluded. That is, the interference of the character(s) on the background of the image to be recognized to the recognition results are excluded, thereby improving an accuracy rate of the character recognition. Next, one or more processors are used to perform the feature extraction on the first feature map to obtain the second feature map, and process the second feature map to obtain the L first candidate character detection boxes, and then screen the L first candidate character detection boxes to obtain the J first target character detection boxes. In this way, the characters in the K first target carrier detection boxes may be detected and screened, which further improves the accuracy rate of the character recognition. Finally, one or more processors are used to recognize the characters in the J first target character detection boxes to obtain the J target character informations. In this way, the character recognition method provided in some embodiments of the present disclosure is able to recognize character informations on a plurality of character carriers at a time, which significantly improves an efficiency of the character recognition, and is able to exclude the background interference, so that the accuracy rate of the character recognition is high.

In the character recognition method provided in some other embodiments of the present disclosure, the K recognition results are obtained according to the respective positions of the J first target character detection boxes in the K first target carrier detection boxes, the J target character information, and the respective positions of the K first target carrier detection boxes in the image to be recognized, and the target character informations in all of the first target character detection boxes that are located in the same first target carrier detection box are in the same recognition result. In this way, not only the characters on the plurality of character carriers may be recognized synchronously, but also the characters on the plurality of character carriers are able to be distinguished after the recognition, which is convenient for a subsequent processing of the recognition results.

In some embodiments of the present disclosure, a character recognition method is further provided. The character recognition method performs a character recognition based on a character recognition neural network. The character recognition method may also be applied to a terminal device, and the terminal device may be a smart phone, a tablet computer, a personal computer, a server, or the like.

Figure 6:
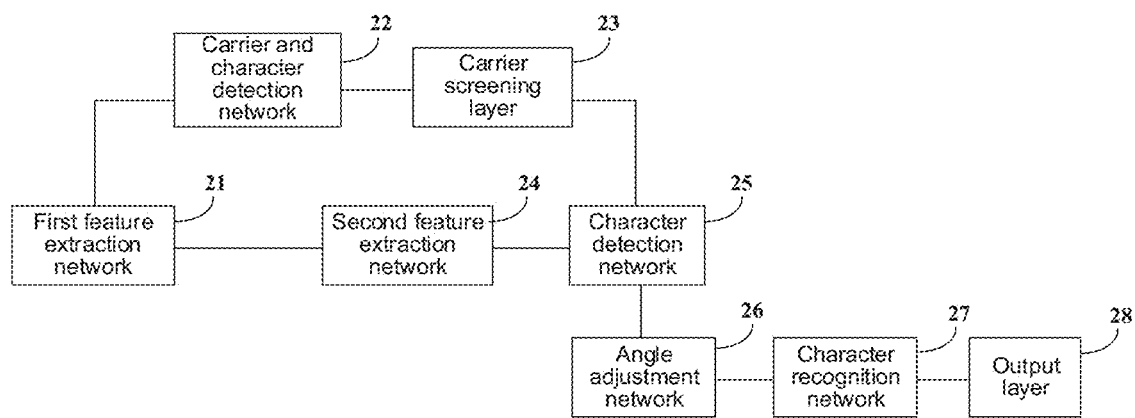
FIG. 6 is a structural block diagram of a character recognition neural network, in accordance with some embodiments of the present disclosure.
Figure 7:
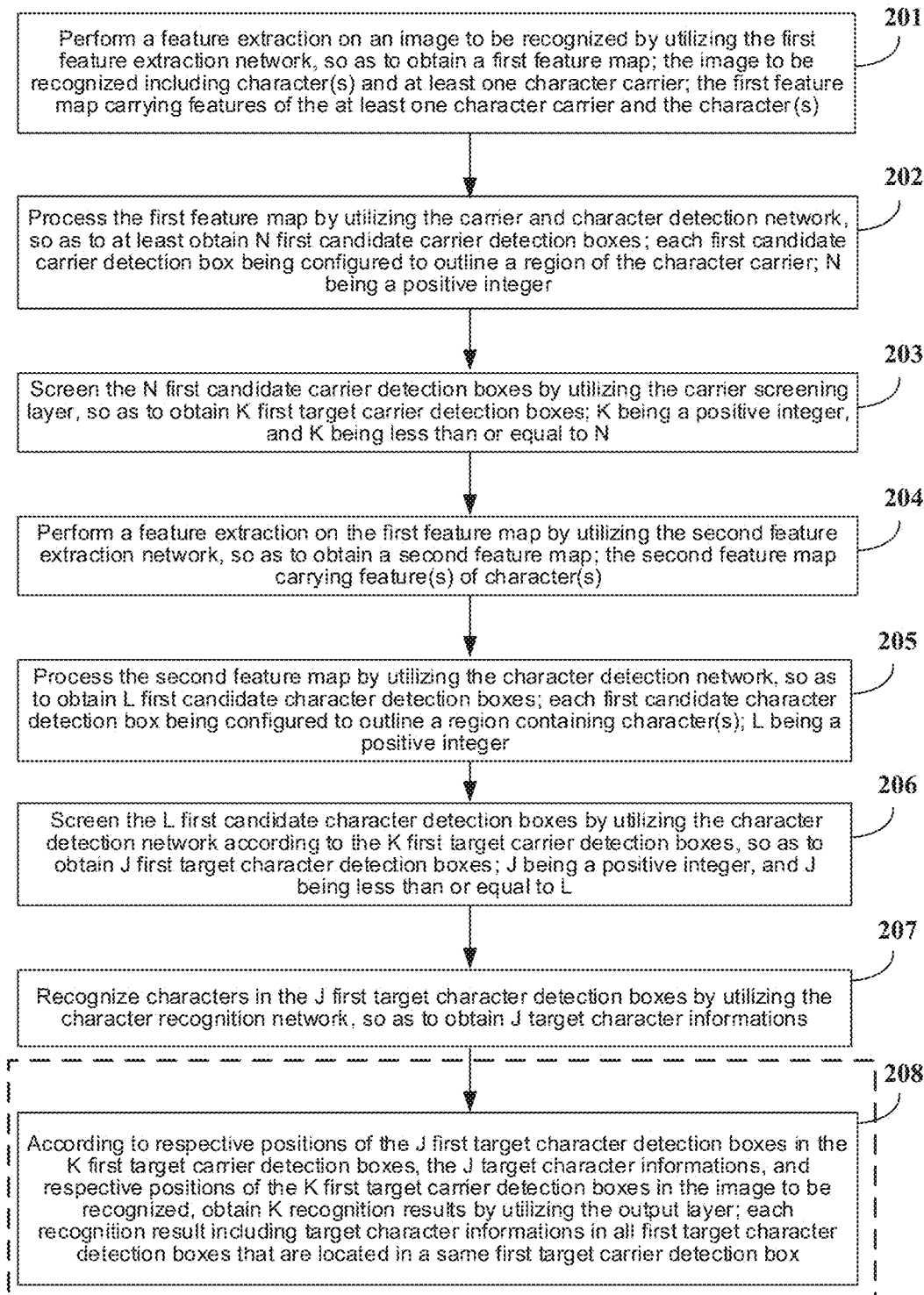
FIG. 7 is a flowchart of another character recognition method, in accordance with some embodiments of the present disclosure.

In some embodiments, as shown in FIG. 6, the character recognition neural network includes a first feature extraction network 21, a carrier and character detection network 22, a carrier screening layer 23, a second feature extraction network 24, a character detection network 25, and a character recognition network 27. In some embodiments, as shown in FIG. 7, the character recognition method includes Steps 201 to 207.

In Step 201, one or more processors perform a feature extraction on an image to be recognized by utilizing the first feature extraction network 21, so as to obtain a first feature map. The image to be recognized includes character(s) and at least one character carrier. The first feature map carries features of the at least one character carrier and the character(s).

In some examples, the character carrier is the character carrier mentioned in Step 101, which will not be repeated here.

In a case where the processor(s) are processor(s) in the terminal device, the terminal device may capture an image including the character(s) and the at least one character carrier through an imaging apparatus mounted thereon, thereby obtaining the image to be recognized. The processor(s) obtain the image to be recognized, and input the image to be recognized into the character recognition neural network to perform the character recognition.

Figure 8:
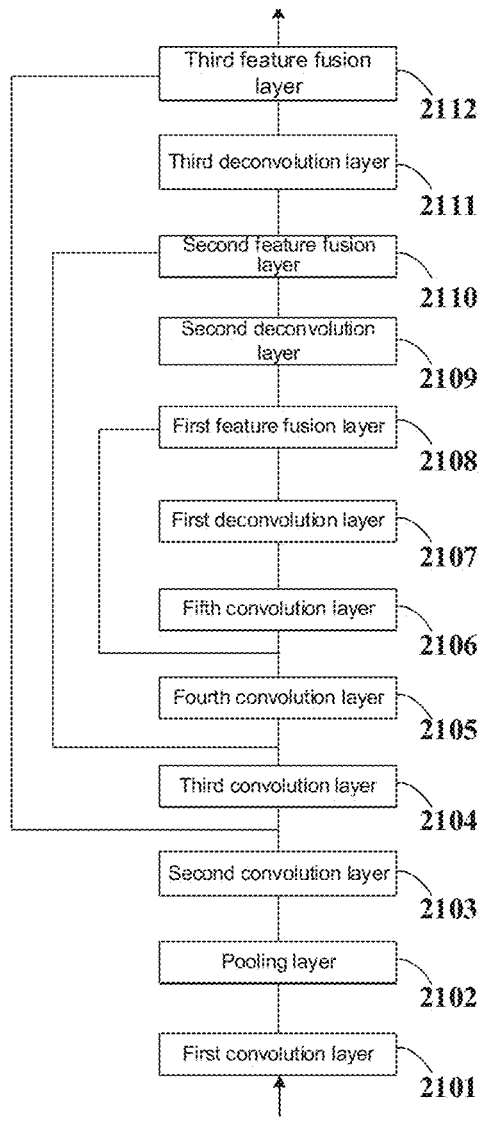
FIG. 8 is a structural block diagram of a first feature extraction network, in accordance with some embodiments of the present disclosure.

For example, as shown in FIG. 8, the first feature extraction network 21 includes a first convolution layer 2101, a pooling layer 2102, a second convolution layer 2103, a third convolution layer 2104, a fourth convolution layer 2105, a fifth convolution layer 2106, a first deconvolution layer 2107, a first feature fusion layer 2108, a second deconvolution layer 2109, a second feature fusion layer 2110, a third deconvolution layer 2111, and a third feature fusion layer 2112.

The first convolution layer 2101 is configured to perform a feature extraction on the input image to be recognized, so as to obtain an eighth feature map. The pooling layer 2102 is configured to perform a down-sampling on the eighth feature map, so as to obtain a ninth feature map. The second convolution layer 2103 is configured to perform a feature extraction on the ninth feature map, so as to obtain a tenth feature map. A resolution of the tenth feature map is a first resolution, and the first resolution is, for example, ¼ of a resolution of the image to be recognized. The third convolution layer 2104 is configured to perform a feature extraction on the tenth feature map, so as to obtain an eleventh feature map. A resolution of the eleventh feature map is a second resolution, and the second resolution is less than the first resolution. The second resolution is, for example, ⅛ of the resolution of the image to be recognized. The fourth convolution layer 2105 is configured to perform a feature extraction on the eleventh feature map, so as to obtain a twelfth feature map. A resolution of the twelfth feature map is a third resolution, and the third resolution is less than the second resolution. The third resolution is, for example, 1/16 of the resolution of the image to be recognized. The fifth convolution layer 2106 is configured to perform a feature extraction on the twelfth feature map, so as to obtain a thirteenth feature map. A resolution of the thirteenth feature map is a fourth resolution, and the fourth resolution is less than the third resolution. The fourth resolution is, for example, 1/32 of the resolution of the image to be recognized. The first deconvolution layer 2107 is configured to perform a deconvolution processing on the thirteenth feature map, so as to obtain a fourteenth feature map, and a resolution of the fourteenth feature map is the third resolution. The first feature fusion layer 2108 is configured to fuse the fourteenth feature map with the twelfth feature map, so as to obtain a first fusion feature map, and a resolution of the first fusion feature map is the third resolution mentioned. The second deconvolution layer 2109 is configured to perform a deconvolution processing on the first fusion feature map, so as to obtain a fifteenth feature map, and a resolution of the fifteenth feature map is the second resolution. The second feature fusion layer 2110 is configured to fuse the fifteenth feature map with the eleventh feature map, so as to obtain a second fusion feature map, and a resolution of the second fusion feature map is the second resolution. The third deconvolution layer 2111 is configured to perform a deconvolution processing on the second fusion feature map, so as to obtain a sixteenth feature map, and a resolution of the sixteenth feature map is the first resolution. The third feature fusion layer 2112 is configured to fuse the sixteenth feature map with the tenth feature map, so as to obtain the first feature map, and a resolution of the first feature map is the first resolution. In this way, low-level features of the convolution parts and high-level features of the deconvolution parts are fused in multi-scale feature, which not only retains a detail texture information, but also increases a semantic information, and further fuses multiple scales, thereby adapting to a detection of characters with different sizes, and improving detection effects.

For example, the first deconvolution layer 2107, the second deconvolution layer 2109, and the third deconvolution layer 2111 each includes a 1×1 convolution kernel and an up-sampling operation unit, but the embodiments of the present disclosure are not limited thereto. In the first deconvolution layer 2107, the second deconvolution layer 2109, and the third deconvolution layer 2111, due to the processing of each deconvolution layer, a resolution of a feature map output from the deconvolution layer becomes twice a resolution of a feature map input into the deconvolution layer.

For example, the first feature fusion layer 2108, the second feature fusion layer 2110, and the third feature fusion layer 2112 adopt a Feature Pyramid Networks for Object Detection (FPN) algorithm to fuse two feature maps, but the embodiments of the present disclosure are not limited thereto.

It will be noted that a structure of the first feature extraction network 21 is not limited to the structure shown in FIG. 8.

In Step 202, one or more processors process the first feature map by utilizing the carrier and character detection network 22, so as to at least obtain N first candidate carrier detection boxes. Each first candidate carrier detection box is configured to outline a region of the character carrier, and N is a positive integer.

In some examples, one or more processors processing the first feature map by utilizing the carrier and character detection network 22, so as to at least obtain the N first candidate carrier detection boxes, includes: one or more processors processing the first feature map by utilizing the carrier and character detection network 22, so as to obtain the N first candidate carrier detection boxes and M first character detection boxes. Each first character detection box is configured to outline an area containing character(s), and M is a positive integer.

For example, the first feature map output from the first feature extraction network 21 is input into the carrier and character detection network 22, and the carrier and character detection network 22 uses the RPN method to process the first feature map, so as to obtain the N first candidate carrier detection boxes and the M first character detection boxes. Each first character detection box may include a row of characters with a character spacing of less than a preset first character spacing threshold. It will be noted that the method of processing the first feature map by the carrier and character detection network 22 is not limited to the RPN method.

In Step 203, one or more processors screen the N first candidate carrier detection boxes by utilizing the carrier screening layer 23, so as to obtain K first target carrier detection boxes, K is a positive integer, and K is less than or equal to N.

Figure 9:
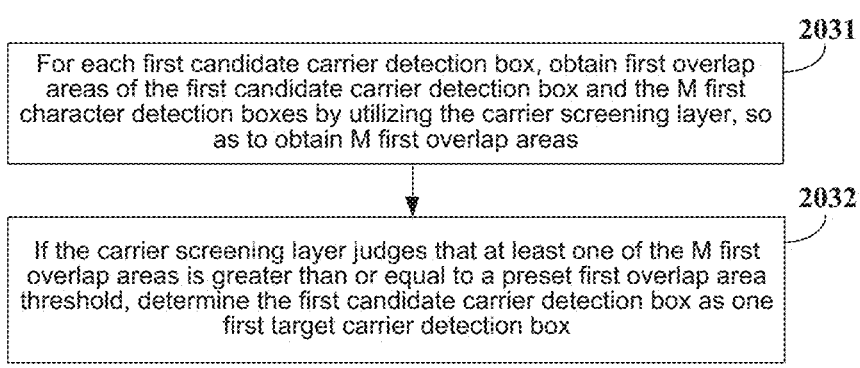
FIG. 9 is a flowchart of Step 203, in accordance with some embodiments of the present disclosure.

In some examples, as shown in FIG. 9, one or more processors screening the N first candidate carrier detection boxes by utilizing the carrier screening layer 23, so as to obtain the K first target carrier detection boxes, includes Steps 2031 and 2032.

In Step 2031, for each first candidate carrier detection box, one or more processors obtain first overlap areas of the first candidate carrier detection box and the M first character detection boxes by utilizing the carrier screening layer 23, so as to obtain M first overlap areas.

In Step 2032, if the carrier screening layer 23 judges that at least one of the M first overlap areas is greater than or equal to a preset first overlap area threshold, the first candidate carrier detection box is determined as the first target carrier detection box.

On this basis, if the carrier screening layer 23 judges that the M first overlap areas are all less than the preset first overlap area threshold, the first candidate carrier detection box is removed. That is, the character carrier outlined by the first candidate carrier detection box is a character carrier recognized by mistake.

Thus, by screening the N first candidate carrier detection boxes one by one, a first candidate carrier detection box recognized by mistake may be deleted, so as to improve a subsequent recognition efficiency, and reduce a misrecognition.

In Step 204, one or more processors perform a feature extraction on the first feature map by utilizing the second feature extraction network 24, so as to obtain a second feature map. The second feature map carries feature(s) of character(s). In some examples, as shown in FIG. 10, the second feature extraction network 24 includes a sixth convolution layer 241, a seventh convolution layer 242, an eighth convolution layer 243, a fourth deconvolution layer 244, a fourth feature fusion layer 245, a fifth deconvolution layer 246, a fifth feature fusion layer 247, a sixth deconvolution layer 248, and a sixth feature fusion layer 249.

The sixth convolution layer 241 is configured to perform a feature extraction on the first feature map, so as to obtain a seventeenth feature map. A resolution of the seventeenth feature map is a sixth resolution, and the sixth resolution is, for example, ⅛ of the resolution of the image to be recognized. The seventh convolution layer 242 is configured to perform a feature extraction on the seventeenth feature map, so as to obtain an eighteenth feature map. A resolution of the eighteenth feature map is a seventh resolution, and the seventh resolution is less than the sixth resolution. The seventh resolution is, for example, 1/16 of the resolution of the image to be recognized. The eighth convolution layer 243 is configured to perform a feature extraction on the eighteenth feature map, so as to obtain a nineteenth feature map. A resolution of the nineteenth feature map is an eighth resolution, and the eighth resolution is less than the seventh resolution. The eighth resolution is, for example, 1/32 of the resolution of the image to be recognized. The fourth deconvolution layer 244 is configured to perform a deconvolution processing on the nineteenth feature map, so as to obtain a twentieth feature map, and a resolution of the twentieth feature map is the seventh resolution. The fourth feature fusion layer 245 is configured to fuse the eighteenth feature map with the twentieth feature map, so as to obtain a third fusion feature map, and a resolution of the third fusion feature map is the seventh resolution. The fifth deconvolution layer 246 is configured to perform a deconvolution processing on the third fusion feature map, so as to obtain a twenty-first feature map, and a resolution of the twenty-first feature map is the sixth resolution. The fifth feature fusion layer 247 is configured to fuse the twenty-first feature map with the seventeenth feature map, so as to obtain a fourth fusion feature map, and a resolution of the fourth fusion feature map is the sixth resolution. The sixth deconvolution layer 248 is configured to perform a deconvolution processing on the fourth fusion feature map, so as to obtain a twenty-second feature map. A resolution of the twenty-second feature map is a fifth resolution, and the fifth resolution is greater than the sixth resolution. The fifth resolution is, for example, ¼ of the resolution of the image to be recognized. The sixth feature fusion layer 249 is configured to fuse the twenty-second feature map with the first feature map, so as to obtain the second feature map, and a resolution of the second feature map is the fifth resolution.

For example, the fourth deconvolution layer 244, the fifth deconvolution layer 246, and the sixth deconvolution layer 248 each includes a 1×1 convolution kernel and an up-sampling operation unit, but the embodiments of the present disclosure are not limited thereto. In the fourth deconvolution layer 244, the fifth deconvolution layer 246, and the sixth deconvolution layer 248, due to the processing of each deconvolution layer, a resolution of a feature map output from the deconvolution layer becomes twice a resolution of a feature map input into the deconvolution layer.

For example, the fourth feature fusion layer 245, the fifth feature fusion layer 247, and the sixth feature fusion layer 249 adopt the FPN algorithm to fuse two feature maps, but the embodiments of the present disclosure are not limited thereto.

It will be noted that a structure of the second feature extraction network 24 is not limited to the structure shown in FIG. 10.

It will further be noted that the above first feature extraction network includes the plurality of convolution layers, the plurality of deconvolution layers, and the plurality of feature fusion layers, which may be understood as a plurality of multi-dimensional matrices. Features (e.g., the first feature map) extracted by the first feature extraction network are data obtained by convolution calculation of matrix data of the image to be recognized, which are abstract multi-dimensional matrix data. The second feature extraction network is similar to the first feature extraction network, and may also be understood as a plurality of multi-dimensional matrices. Features (e.g., the second feature map) extracted by the second feature extraction network are data obtained by convolution calculation of matrix data of the first feature map, which are also abstract multi-dimensional matrix data.

In Step 205, one or more processors process the second feature map by utilizing the character detection network 25, so as to obtain L first candidate character detection boxes. Each first candidate character detection box is configured to outline a region containing character(s), and L is a positive integer.

In some examples, each first candidate character detection box may include a row of characters with a character spacing of less than a preset second character spacing threshold.

In Step 206, one or more processors screen the L first candidate character detection boxes by utilizing the character detection network 25 according to the K first target carrier detection boxes, so as to obtain J first target character detection boxes, J is positive integer, and J is less than or equal to L.

In some examples, as shown in FIG. 11, one or more processors screening the L first candidate character detection boxes by utilizing the character detection network 25 according to the K first target carrier detection boxes, so as to obtain the J first target character detection boxes, includes Steps 2061 and 2062.

In Step 2061, for each first candidate character detection box, one or more processors obtain second overlap areas of the first candidate character detection box and the K first target carrier detection boxes by utilizing the character detection network 25, so as to obtain K second overlap areas.

In Step 2062, if the character detection network 25 judges that at least one of the K second overlap areas is greater than or equal to a preset second overlap area threshold, the first candidate character detection box is determined as the first target character detection box.

On this basis, if the character detection network 25 judges that the K second overlap areas are all less than the preset second overlap area threshold, the first candidate character detection box is removed. That is, character(s) outlined by the first candidate character detection box may be irrelevant background character(s).

Thus, by screening the L first candidate character detection boxes one by one, the irrelevant background character(s) may be removed, so as to improve a subsequent recognition efficiency.

In Step 207, one or more processors recognize characters in the J first target character detection boxes by utilizing the character recognition network 27, so as to obtain J target character informations.

In some examples, the character recognition neural network further includes an angle adjustment network 26. The character recognition method further includes: one or more processors extracting J first target character regions from the image to be recognized by utilizing the angle adjustment network 26 according to position informations of the J first target character detection boxes, so as to obtain J first character images. For each first character image, if the angle adjustment network 26 judges that a direction of a designated edge of the first character image is inclined relative to a reference direction, an angle of the first character image is adjusted, so that the designated edge of the first character image extends along the reference direction.

In a case where each first candidate character detection box includes the row of characters with the character spacing of less than the preset second character spacing threshold, each of the J first target character detection boxes screened out from the L first candidate character detection boxes also includes a row of characters with a character spacing of less than the preset second character spacing threshold. In this way, the direction of the designated edge of the first character image is, for example, an arrangement direction of the characters. In other words, the designated edge of the first character image is a long side of the first character image.

On this basis, one or more processors recognize the characters in the J first target character detection boxes by utilizing the character recognition network 27, so as to obtain the J target character informations, includes: one or more processors obtaining J first character images whose designated edges all extend along the reference direction from the angle adjustment network 26 by utilizing the character recognition network 27, and recognizing characters in the J first character images, so as to obtain the J target character informations.

In some examples, the character recognition network 27 includes two 3×3×64 convolution layers, two 3×3×128 convolution layers, two 3×3×256 convolution layers, Long Short-Term Memory (bidirectional LSTM) module, and fully connected layer, but is not limited thereto.

In some other embodiments, as shown in FIG. 6, the character recognition neural network further includes an output layer 28. Based on this, the character recognition method provided in some embodiments of the present disclosure further includes Step 208.

In Step 208, one or more processors obtain K recognition results by utilizing the output layer 28, according to respective positions of the J first target character detection boxes in the K first target carrier detection boxes, the J target character informations, and respective positions of the K first target carrier detection boxes in the image to be recognized. Each recognition result includes target character informations in all first target character detection boxes that are located in a same first target carrier detection box.

It will be noted that in the above character recognition method based on the character recognition neural network, the character recognition neural network is a trained character recognition neural network. A method of training a character recognition neural network to be trained will be introduced below.

When training the character recognition neural network to be trained, a first feature extraction network to be trained and a carrier and character detection network to be trained may be trained first, and then a second feature extraction network to be trained and a character detection network to be trained are trained. Next, a character recognition network to be trained is trained. Finally, the entire character recognition neural network to be trained is trained.

Figure 12:
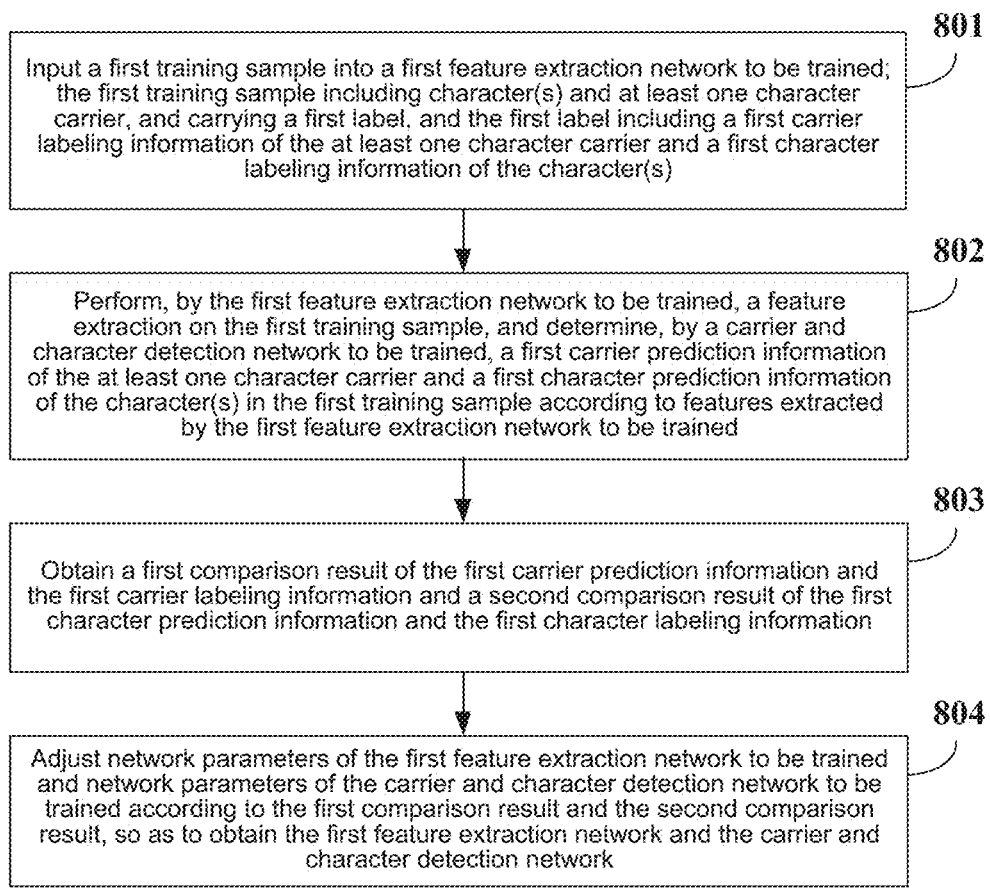
FIG. 12 is a flowchart of training a first feature extraction network and a carrier and character detection network, in accordance with some embodiments of the present disclosure.

In some embodiments, as shown in FIG. 12, a method of training the first feature extraction network to be trained and the carrier and character detection network to be trained includes Steps 801 to 804.

In Step 801, one or more processors input a first training sample into the first feature extraction network to be trained. The first training sample includes character(s) and at least one character carrier, and carries a first label. The first label includes a first carrier labeling information of the at least one character carrier and a first character labeling information of the character(s).

In some examples, the first training sample is a first image including the at least one character carrier and the character(s), and the first image carries the first label. Area(s) of the at least one character carrier in the first image may be outlined by at least one first character carrier labeling box, and the area of each character carrier corresponds to one first character carrier labeling box. The first carrier labeling information includes a first sub-carrier labeling information of the character carrier outlined by each first character carrier labeling box, and the first sub-carrier labeling information may include a carrier identification and a carrier position information of the character carrier. Area(s) each containing character(s) in the first image may be outlined by at least one first character labeling box. The first character labeling information includes a first sub-character labeling information of the character(s) outlined by each first character labeling box, and the first sub-character labeling information may include a character information in the first character labeling box and a position information of the character(s) in the first character labeling box.

It will be noted that the at least one first character carrier labeling box and the at least one first character labeling box are standard boxes. Accordingly, the first carrier labeling information and the first character labeling information are standard informations, and the standard informations are configured to be compared with prediction informations (i.e., a first carrier prediction information and a first character prediction information that will be described later) obtained by the carrier and character detection network to be trained. For example, the first character carrier labeling box and the first character labeling box are obtained by manually recognizing and outlining the area of the character carrier and the area containing the character(s), but the embodiments of the present disclosure do not limit this.

For example, the first training sample further includes first training data. The processor(s) may establish a coordinate system on the first image. Four corners of each first character carrier labeling box respectively correspond to four coordinates, and four corners of each first character labeling box respectively correspond to four coordinates. In this way, the first training data may include the coordinates of the at least one first character carrier labeling box and the coordinates of the at least one first character labeling box, and thus may represent the carrier position information(s) of the at least one character carrier and position information(s) of the at least one first character labeling box. The position information of each first character labeling box is configured to represent the position information of the character(s) in the first character labeling box.

In some other examples, the first training sample is a plurality of first images, each first image includes at least one character carrier and character(s), and each first image carries the first label. The condition that the first training sample is the plurality of first images may refer to the condition that the first training sample is one first image, which will not be repeated here.

In Step 802, the first feature extraction network to be trained performs a feature extraction on the first training sample, and the carrier and character detection network to be trained determines the first carrier prediction information of the at least one character carrier and the first character prediction information of the character(s) in the first training sample according to features extracted by the first feature extraction network to be trained.

In some examples, the carrier and character detection network to be trained obtains at least one first character carrier prediction box and at least one first character prediction box according to the features extracted by the first feature extraction network to be trained. Each first character carrier prediction box is configured to outline a region of the character carrier. The first carrier prediction information includes a first sub-carrier prediction information of the character carrier outlined by each first character carrier prediction box, and the first sub-carrier prediction information may include a prediction identification and a prediction position information of the character carrier. Each first character prediction box is configured to outline a region containing character(s). The first character prediction information includes a first sub-character prediction information of the character(s) outlined by each first character prediction box, and the first sub-character prediction information may include a prediction character information in the first character prediction box and a prediction position information of the character(s) in the first character prediction box.

In Step 803, one or more processors obtain a first comparison result of the first carrier prediction information and the first carrier labeling information, and a second comparison result of the first character prediction information and the first character labeling information.

In some examples, the processor(s) obtain the first comparison result and the second comparison result according to a loss function. The loss function may reflect a deviation between a prediction result output from a trained network and a manually labeled real result. The loss function includes a target classification loss function and a bounding box regression loss function. The principle of the target classification loss function is based on cross entropy loss, and the principle of the bounding box regression loss function is based on smooth L1 loss. For example, the processor(s) use a Single Shot MultiBox Detector (SSD) target detection method to obtain the first comparison result and the second comparison result.

In Step 804, one or more processors adjust network parameters of the first feature extraction network to be trained and network parameters of the carrier and character detection network to be trained according to the first comparison result and the second comparison result, so as to obtain the first feature extraction network 21 and the carrier and character detection network 22.

If the processor(s) judge that the first comparison result and the second comparison result meet a first preset condition, the training is stopped, and the first feature extraction network 21 and the carrier and character detection network 22 are obtained. For example, the processor(s) preset a first loss threshold, and if the processor(s) judge that the first comparison result and the second comparison result are less than the first loss threshold, the training is stopped. It will be noted that the condition for stopping the training may not be limited to the above manner.

Figure 13:
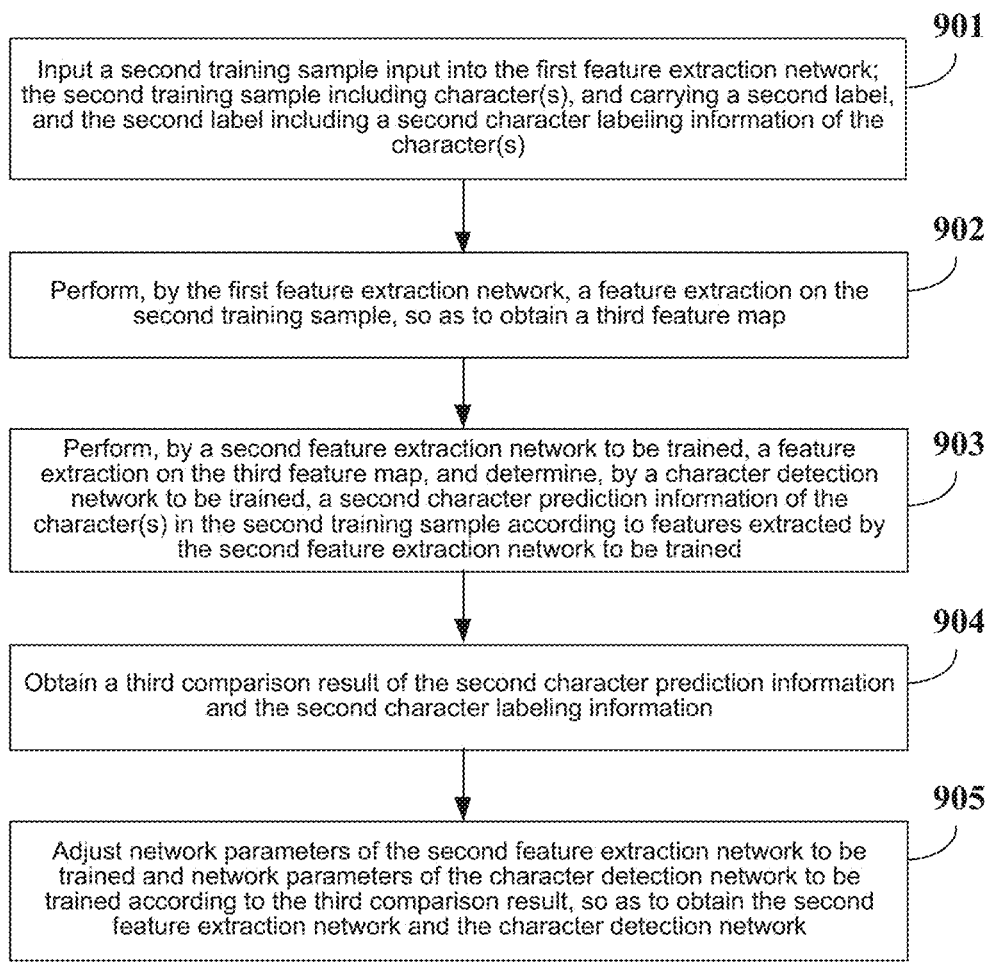
FIG. 13 is a flowchart of training a second feature extraction network and a character detection network, in accordance with some embodiments of the present disclosure.

In some embodiments, as shown in FIG. 13, a method of training the second feature extraction network to be trained and the character detection network to be trained includes Steps 901 to 905.

In Step 901, one or more processors input a second training sample into the first feature extraction network 21. The second training sample includes character(s), and carries a second label. The second label includes a second character labeling information of the character(s).

In some examples, the second training sample is a second image including the character(s), and the second image carries the second label. Areas each containing character(s) in the second image may be outlined by at least one second character labeling box. The second character labeling information includes a second sub-character labeling information of the character(s) outlined by each second character labeling box, and the second sub-character labeling information may include a character information in the second character labeling box and a position information of the character(s) in the second character labeling box.

It will be noted that the at least one second character labeling box is a standard box. Accordingly, the second character labeling information is a standard information, and the standard information is configured to be compared with a prediction information (i.e., a second character prediction information that will be described later) obtained by the character detection network to be trained. For example, the second character labeling box is obtained by manually recognizing and outlining the area containing the character(s), but the embodiments of the present disclosure do not limit this.

For example, the second training sample further includes second training data. The processor(s) may establish a coordinate system on the second image. Four corners of each second character labeling box correspond to four coordinates, respectively. In this way, the second training data may include the coordinates of the at least one second character labeling box, and thus may represent position information(s) of the at least one second character labeling box. The position information of each second character labeling box is configured to represent the position information of the character(s) in the second character labeling box.

In some other examples, the second training sample is a plurality of second images, each second image includes character(s), and each second image carries the second label. The condition that the second training sample is the plurality of second images may refer to the condition that the second training sample is one second image, which will not be repeated here.

In Step 902, the first feature extraction network 21 performs a feature extraction on the second training sample, so as to obtain a third feature map.

It will be noted that if the second training sample only includes the character(s) without a character carrier, the third feature map may only carry feature(s) of the character(s).

In Step 903, the second feature extraction network to be trained performs a feature extraction on the third feature map, and the character detection network to be trained determines a second character prediction information of the character(s) in the second training sample according to features extracted by the second feature extraction network to be trained.

In some examples, the character detection network to be trained obtains at least one second character prediction box according to the features extracted by the second feature extraction network to be trained. Each second character prediction box is configured to outline a region containing character(s). The second character prediction information includes a second sub-character prediction information of the character(s) outlined by each second character prediction box, and the second sub-character prediction information may include a prediction character information in the second character prediction box and a prediction position information of the character(s) in the second character prediction box.

In Step 904, one or more processors obtain a third comparison result of the second character prediction information and the second character labeling information.

In some examples, the processor(s) obtain the third comparison result based on the above loss function. For example, the processor(s) use the Single Shot MultiBox Detector (SSD) target detection method to obtain the third comparison result.

In Step 905, one or more processors adjust network parameters of the second feature extraction network to be trained and network parameters of the character detection network to be trained according to the third comparison result, so as to obtain the second feature extraction network 24 and the character detection network 25.

If the processor(s) judge that the third comparison result meets a second preset condition, the training is stopped, and the second feature extraction network 24 and the character detection network 25 are obtained. For example, the processor(s) preset a second loss threshold, and if the processor(s) judge that the third comparison result is less than the second loss threshold, the training is stopped. It will be noted that the condition for stopping the training may not be limited to the above manner.

Figure 14:
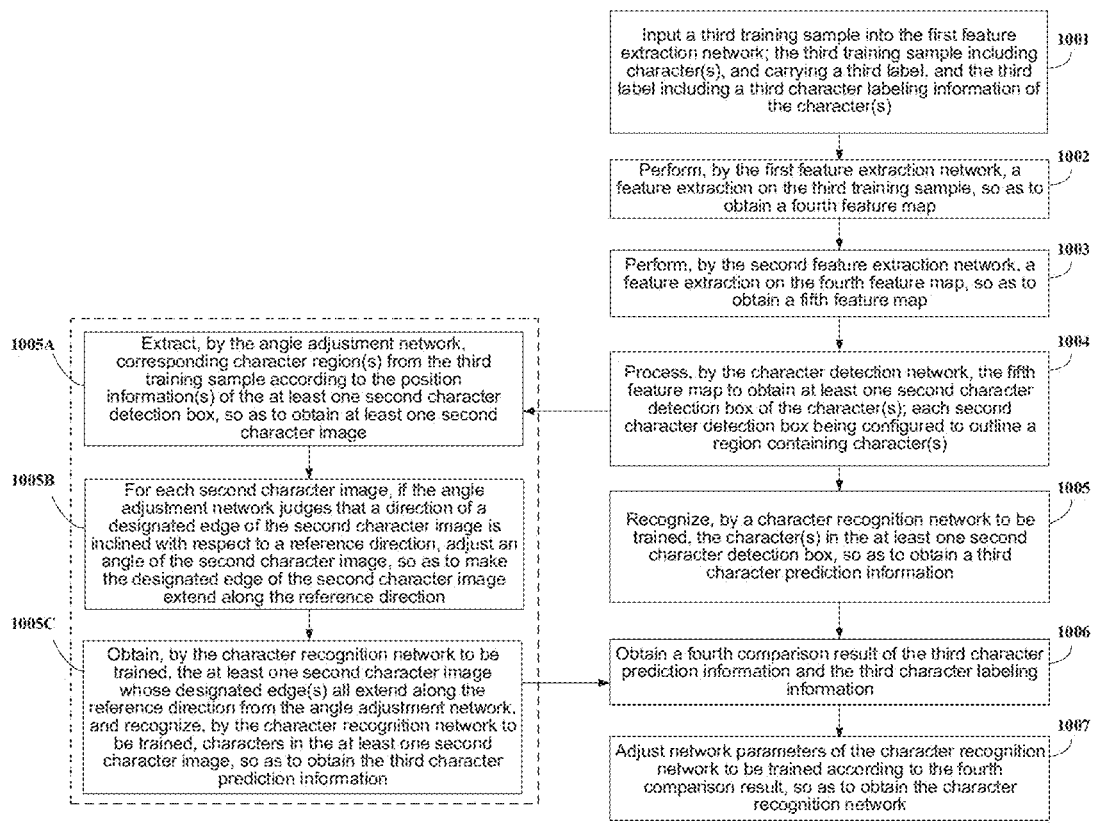
FIG. 14 is a flowchart of training a character recognition network, in accordance with some embodiments of the present disclosure.

In some embodiments, as shown in FIG. 14, a method of training the character recognition network to be trained includes Steps 1001 to 1007.

In Step 1001, one or more processors input a third training sample into the first feature extraction network 21. The third training sample includes character(s), and carries a third label. The third label includes a third character label information of the character(s).

In some examples, the third training sample is a third image including the character(s), and the third image carries the third label. Areas each containing character(s) in the third image may be outlined by at least one third character labeling box. The third character labeling information includes a third sub-character labeling information of the character(s) outlined by each third character labeling box, and the third sub-character labeling information may include a character information in the third character labeling box and a position information of the character(s) in the third character labeling box.

It will be noted that the at least one third character labeling box is standard box(es). Accordingly, the third character labeling information is a standard information, and the standard information is configured to be compared with a prediction information (i.e., a third character prediction information that will be described later) obtained by the character recognition network to be trained. For example, the third character labeling box is obtained by manually recognizing and outlining the area containing the character(s), but the embodiments of the present disclosure do not limit this.

For example, the third training sample further includes third training data. The processor(s) may establish a coordinate system on the third image. Four corners of each third character labeling box correspond to four coordinates, respectively. In this way, the third training data may include the coordinates of the at least one third character labeling box, and thus may represent position information(s) of the at least one third character labeling box. The position information of each third character labeling box is configured to represent the position information of the character(s) in the third character labeling box.

In some other examples, the third training sample is a plurality of third images, each third image includes character(s), and each third image carries the third label. The condition that the third training sample is the plurality of third images may refer to the condition that the third training sample is one third image, which will not be repeated here.

In Step 1002, the first feature extraction network 21 performs a feature extraction on the third training sample, so as to obtain a fourth feature map.

It will be noted that if the third training sample only includes the character(s) without a character carrier, the fourth feature map may only carry feature(s) of the character(s).

In Step 1003, the second feature extraction network 24 performs a feature extraction on the fourth feature map, so as to obtain a fifth feature map.

In Step 1004, the character detection network 25 processes the fifth feature map, so as to obtain at least one second character detection box of the character(s) in the third training sample. Each second character detection box is configured to outline a region containing character(s).

In Step 1005, the character recognition network to be trained recognizes the character(s) in the at least one second character detection box, so as to obtain the third character prediction information.

In some examples, the third character prediction information includes a third sub-character prediction information of the character(s) outlined by each second character detection box, and the third sub-character prediction information may include a prediction character information in the second character detection box and a prediction position information of the character(s) in the second character detection box.

In Step 1006, one or more processors obtain a fourth comparison result of the third character prediction information and the third character labeling information.

In some examples, the processor(s) obtain the fourth comparison result according to the above loss function. For example, the processor(s) use the Single Shot MultiBox Detector (SSD) target detection method to obtain the fourth comparison result.

In Step 1007, one or more processors adjust network parameters of the character recognition network to be trained according to the fourth comparison result, so as to obtain the character recognition network 27.

If the processor(s) judge that the fourth comparison result meets a third preset condition, the training is stopped, and the character recognition network 27 is obtained. For example, the processor(s) preset a third loss threshold, and if the processor(s) judge that the fourth comparison result is less than the third loss threshold, the training is stopped. It will be noted that the condition for stopping the training may not be limited to the above manner.

In some other embodiments, Steps 1005A to 1005C are used instead of Step 1005.

In Step 1005A, the angle adjustment network 26 extracts corresponding character region(s) from the third training sample according to the position information(s) of the at least one second character detection box, so as to obtain at least one second character image.

In Step 1005B, for each second character image, if the angle adjustment network 26 judges that a direction of a designated edge of the second character image is inclined with respect to a reference direction, an angle of the second character image is adjusted, so as to make the designated edge of the second character image extend along the reference direction.

In a case where each second character detection box includes a row of characters with a character spacing of less than a preset third character spacing threshold, the direction of the designated edge of the second character image is, for example, an arrangement direction of the character(s). In other words, the designated edge of the second character image is a long side of the second character image. For example, the reference direction is a horizontal direction.

In Step 1005C, the character recognition network to be trained obtains the at least one second character image whose designated edge(s) all extend along the reference direction from the angle adjustment network 26, and recognizes characters in the at least one second character image, so as to obtain the third character prediction information.

Figure 15:
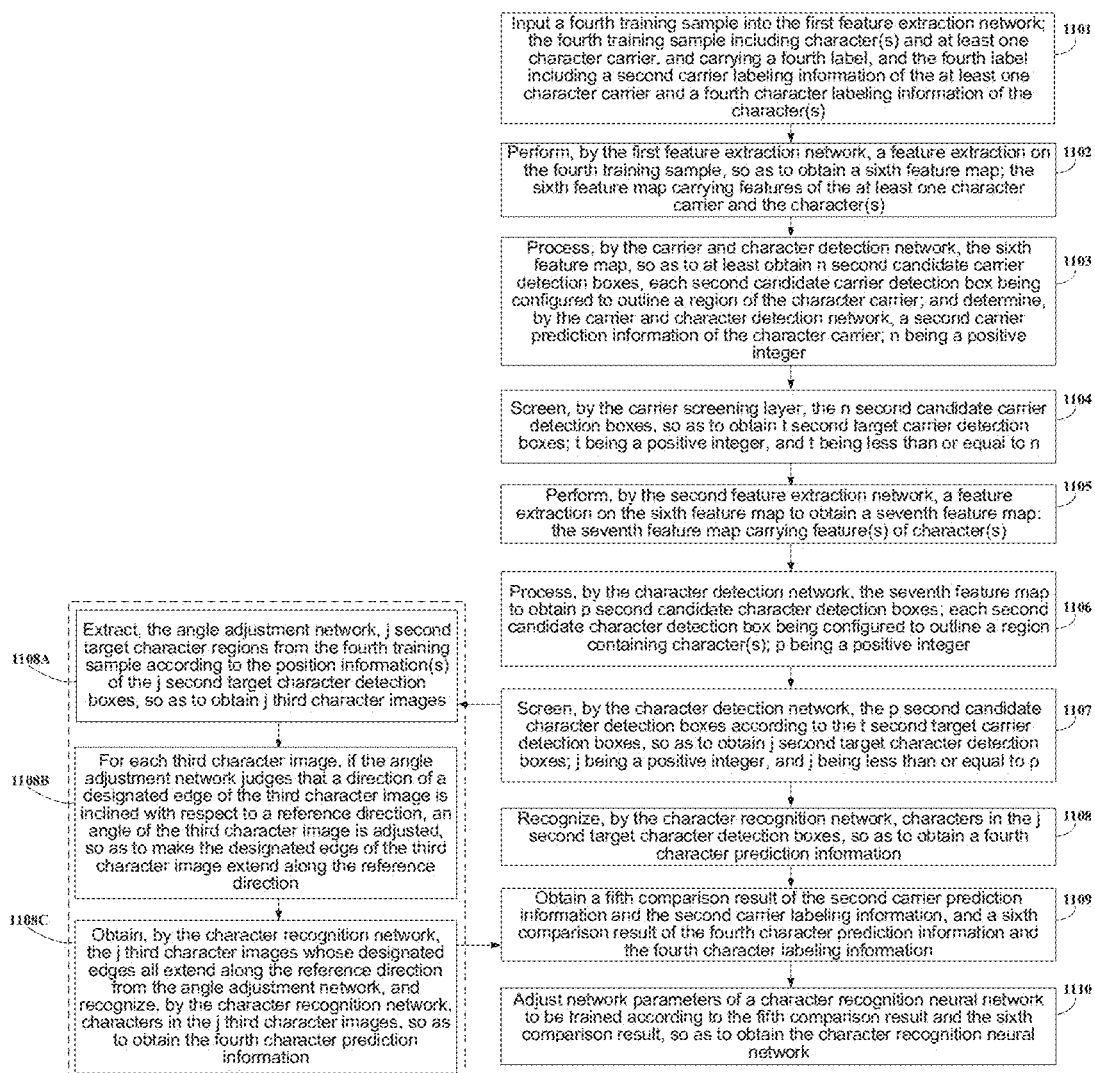
FIG. 15 is a flowchart of training a character recognition neural network, in accordance with some embodiments of the present disclosure.

In some embodiments, as shown in FIG. 15, a method of training the character recognition neural network to be trained includes Steps 1101 to 1110.

In Step 1101, one or more processors input a fourth training sample into the first feature extraction network 21. The fourth training sample includes character(s) and at least one character carrier, and carries a fourth label. The fourth label includes a second carrier labeling information of the at least one character carrier and a fourth character labeling information of the character(s).

In some examples, the fourth training sample is a fourth image including the at least one character carrier and the character(s), and the fourth image carries the fourth label. Area(s) of the at least one character carrier in the fourth image may be outlined by at least one second character carrier labeling box, and the area of each character carrier corresponds to one second character carrier labeling box. The second carrier labeling information includes a second sub-carrier labeling information of the character carrier outlined by each second character carrier labeling box, and the second sub-carrier labeling information may include a carrier identification and a carrier position information of the character carrier. Area(s) each containing character(s) in the fourth image may be outlined by at least one fourth character labeling box. The fourth character labeling information includes a fourth sub-character labeling information of the character(s) outlined by each fourth character labeling box, and the fourth sub-character labeling information may include a character information in the fourth character labeling box and a position information of the character(s) in the fourth character labeling box.

It will be noted that the at least one second character carrier labeling box and the at least one fourth character labeling box are standard boxes. Accordingly, the second carrier labeling information and the fourth character labeling information are standard informations, and the standard informations are configured to be compared with a second carrier prediction information (described later) obtained by the carrier and character detection network 22 and a fourth character prediction information (described later) obtained by the character recognition network 27, respectively. For example, the second character carrier labeling box and the fourth character labeling box are respectively obtained by manually recognizing and outlining the area of the character carrier and the area containing the character(s), but the embodiments of the present disclosure do not limit this.

For example, the fourth training sample further includes fourth training data. The processor(s) may establish a coordinate system on the fourth image. Four corners of each second character carrier labeling box respectively correspond to four coordinates, and four corners of each fourth character labeling box respectively correspond to four coordinates. In this way, the fourth training data may include the coordinates of the at least one second character carrier labeling box and the coordinates of the at least one fourth character labeling box, and thus may represent the carrier position information(s) of the at least one character carrier and position information(s) of the at least one fourth character labeling box. The position information of each fourth character labeling box is configured to represent the position information of the character(s) in the fourth character labeling box.

In some other examples, the fourth training sample is a plurality of fourth images, each fourth image includes at least one character carrier and character(s), and each fourth image carries the fourth label. The condition that the fourth training sample is the plurality of fourth images may refer to the condition that the fourth training sample is one fourth image, which will not be repeated here.

In Step 1102, the first feature extraction network 21 performs a feature extraction on the fourth training sample, so as to obtain a sixth feature map. The sixth feature map carries features of the at least one character carrier and the character(s).

In Step 1103, the carrier and character detection network 22 processes the sixth feature map, so as to at least obtain n second candidate carrier detection boxes, and determines the second carrier prediction information of the character carrier(s). Each second candidate carrier detection box is configured to outline a region of the character carrier, and n is a positive integer.

In some examples, the carrier and character detection network 22 processing the sixth feature map, so as to at least obtain the n second candidate carrier detection boxes, includes: the carrier and character detection network 22 processing the sixth feature map, so as to obtain the n second candidate carrier detection boxes and m third character detection boxes. Each third character detection box is configured to outline a region containing character(s), and m is a positive integer.

In some examples, the second carrier prediction information includes a second sub-carrier prediction information of the character carrier outlined by each second candidate carrier detection box, and the second sub-carrier prediction information may include a prediction identification and a prediction position information of the character carrier.

For example, n is one, two, three, four or other positive integer, and m is one, two, three, four or other positive integer.

In Step 1104, the carrier screening layer 23 screens the n second candidate carrier detection boxes, so as to obtain t second target carrier detection boxes, t is a positive integer, and t is less than or equal to n.

Here, a method of screening the n second candidate carrier detection boxes by the carrier screening layer 23 may refer to Step 103 described above, which will not be repeated here.

In Step 1105, the second feature extraction network 24 performs a feature extraction on the sixth feature map, so as to obtain a seventh feature map. The seventh feature map carries feature(s) of character(s).

In Step 1106, the character detection network 25 processes the seventh feature map, so as to obtain p second candidate character detection boxes. Each second candidate character detection box is configured to outline a region containing character(s), and p is a positive integer.

In Step 1107, the character detection network 25 screens the p second candidate character detection boxes according to the t second target carrier detection boxes, so as to obtain j second target character detection boxes, j is a positive integer, and j is less than or equal to p.

Here, a method of screening the p second candidate character detection boxes by the character detection network 25 according to the t second target carrier detection boxes may refer to Step 106 described above, which will not be repeated here.

In Step 1108, the character recognition network 27 recognizes characters in the j second target character detection boxes, so as to obtain the fourth character prediction information.

In some examples, the fourth character prediction information includes a fourth sub-character prediction information of character(s) outlined by each second target character detection box, and the fourth sub-character prediction information may include a prediction character information in the second target character detection box and a prediction position information of the character(s) in the second target character detection box.

In Step 1109, one or more processors obtain a fifth comparison result of the second carrier prediction information and the second carrier labeling information and a sixth comparison result of the fourth character prediction information and the fourth character labeling information.

In some examples, the processor(s) obtain the fifth comparison result and the sixth comparison result according to the above loss function. For example, the processor(s) use the Single Shot MultiBox Detector (SSD) target detection method to obtain the fifth comparison result and the sixth comparison result.

In Step 1110, one or more processors adjust network parameters of the character recognition neural network to be trained according to the fifth comparison result and the sixth comparison result, so as to obtain the character recognition neural network.

If the processor(s) judge that the fifth comparison result and the sixth comparison result meet a fourth preset condition, the training is stopped, and the character recognition neural network is obtained. For example, the processor(s) preset a fourth loss threshold, and if the processor(s) judge that the fifth comparison result and the sixth comparison result are less than the fourth loss threshold, the training is stopped. It will be noted that the condition for stopping the training may not be limited to the above manner.

In some other embodiments, Steps 1108A to 1108C are used instead of Step 1108.

In Step 1108A, the angle adjustment network 26 extracts j second target character regions from the fourth training sample according to the position information(s) of the j second target character detection boxes, so as to obtain j third character images.

In Step 1108B, for each third character image, if the angle adjustment network 26 judges that a direction of a designated edge of the third character image is inclined with respect to a reference direction, an angle of the third character image is adjusted, so as to make the designated edge of the third character image extend along the reference direction.

Step 1108A and Step 1108B may refer to Step 1005A and Step 1005B, respectively, which will not be repeated here.

In Step 1108C, the character recognition network 27 obtains the j third character images whose designated edges all extend along the reference direction from the angle adjustment network 26, and recognizes characters in the j third character images, so as to obtain the fourth character prediction information.

It will be noted that the network parameters of the aforementioned networks include learnable parameters in all convolution layers of the networks, such as weights, offset values, etc. In addition, the processor(s) adjusting the network parameters of the character recognition neural network to be trained refers to fine-tuning the network parameters of the networks that have been trained, so as to make the networks cooperate well.

In some embodiments of the present disclosure, a terminal device is provided. The terminal device includes processor(s) and a memory. The memory is configured to store computer programs. The processor(s) are configured to execute the computer programs stored in the memory, so as to implement the character recognition method as shown in FIG. 1.

In some embodiments of the present disclosure, a terminal device is provided. The terminal device includes processor(s) and a memory. The memory is configured to store program instructions of the character recognition neural network. The processor(s) are configured to execute the program instructions of the character recognition neural network stored in the memory, so as to implement the character recognition method as shown in FIG. 7.

Figure 16:
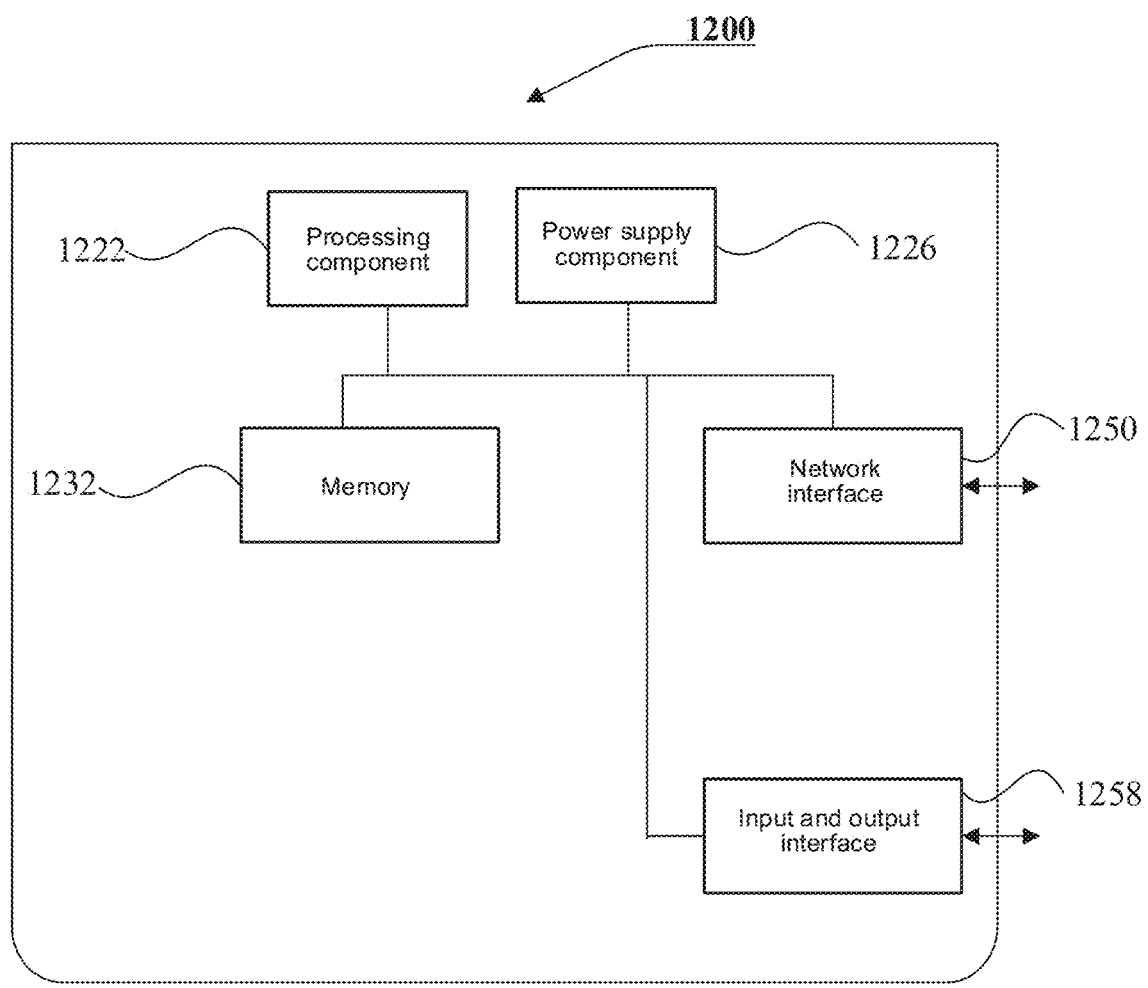
FIG. 16 is a structural block diagram of a terminal device, in accordance with some embodiments of the present disclosure.

FIG. 16 is a structural block diagram of a terminal device in accordance with some embodiments of the present disclosure. In some embodiments, referring to FIG. 16, the terminal device 1200 includes: a processing component 1222 including one or more processors; and a memory 1232 configured to store instructions executed by the processing component 1222. The processing component 1222 is configured to execute the instructions, so as to execute the above character recognition method.

In some other embodiments, as shown in FIG. 16, the terminal device 1200 further includes: a power supply component 1226 configured to perform a power management of the terminal device 1200; a network interface 1250 configured to connect the terminal device 1200 to a network; and an input and output interface 1258. The network interface 1250 may be wired or wireless.

In some examples, the terminal device 1200 is a server.

In the embodiments of the present disclosure, a non-transitory computer-readable storage medium is further provided. The non-transitory computer-readable storage medium stores computer programs, and the computer programs implement the character recognition method as shown in FIG. 1 when being executed by processor(s).

In the embodiments of the present disclosure, a non-transitory computer-readable storage medium is further provided. The non-transitory computer-readable storage medium stores program instructions of the character recognition neural network, and the program instructions implement the character recognition method as shown in FIG. 7 when being executed by processor(s).

In some embodiments, the non-transitory computer-readable storage medium is the memory 1232 storing the computer programs or storing the program instructions of the character recognition neural network. The computer programs or the program instructions of the character recognition neural network may be executed by the processing component 1222 in the terminal device 1200, so as to implement the above character recognition method. For example, the non-transitory computer-readable storage medium includes, but is not limited to, a ROM, a RAM, a CD-ROM, a magnetic tape, a floppy disk, or an optical data storage device.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A character recognition method, comprising:
    performing a feature extraction on an image to be recognized to obtain a first feature map; the image to be recognized including at least one character and at least one character carrier; the first feature map carrying features of the at least one character carrier and the at least one character;
    processing the first feature map to at least obtain N first candidate carrier detection boxes; each first candidate carrier detection box being configured to outline a region of a character carrier in the at least one character carrier; N being a positive integer;
    screening the N first candidate carrier detection boxes to obtain K first target carrier detection boxes; K being a positive integer, and K being less than or equal to N;
    performing a feature extraction on the first feature map to obtain a second feature map; the second feature map carrying at least one feature of at least one character;
    processing the second feature map to obtain L first candidate character detection boxes; each first candidate character detection box being configured to outline a region containing at least one character; L being a positive integer;
    screening the L first candidate character detection boxes to obtain J first target character detection boxes according to the K first target carrier detection boxes; J being a positive integer, and J being less than or equal to L; and
    recognizing characters in the J first target character detection boxes to obtain J target character informations.

2. The character recognition method according to claim 1, further comprising:
    according to respective positions of the J first target character detection boxes in the K first target carrier detection boxes, the J target character informations, and respective positions of the K first target carrier detection boxes in the image to be recognized, obtaining K recognition results; each recognition result including target character informations in all first target character detection boxes that are located in a same first target carrier detection box.

3. The character recognition method according to claim 1, wherein processing the first feature map to at least obtain the N first candidate carrier detection boxes, includes: processing the first feature map to obtain the N first candidate carrier detection boxes and M first character detection boxes; each first character detection box being configured to outline a region containing at least one character; M being a positive integer; and
    screening the N first candidate carrier detection boxes to obtain the K first target carrier detection boxes, includes:
    for each first candidate carrier detection box, obtaining first overlap areas of the first candidate carrier detection box and the M first character detection boxes, so as to obtain M first overlap areas;
    determining whether at least one of the M first overlap areas is greater than or equal to a preset first overlap area threshold, and in response to determining that at least one of the M first overlap areas is greater than or equal to the preset first overlap area threshold, determining the first candidate carrier detection box as one first target carrier detection box.

4. The character recognition method according to claim 1, wherein screening the L first candidate character detection boxes to obtain the J first target character detection boxes according to the K first target carrier detection boxes, includes:
    for each first candidate character detection box, obtaining second overlap areas of the first candidate character detection box and the K first target carrier detection boxes, so as to obtain K second overlap areas;
    determining whether at least one of the K second overlap areas is greater than or equal to a preset second overlap area threshold, and in response to determining that at least one of the K second overlap areas is greater than or equal to the preset second overlap area threshold, determining the first candidate character detection box as one first target character detection box.

5. The character recognition method according to claim 1, wherein recognizing the characters in the J first target character detection boxes to obtain the J target character informations, includes:
    according to position informations of the J first target character detection boxes, extracting J first target character regions from the image to be recognized, so as to obtain J first character images;
    for each first character image, determining whether a direction of a designated edge of the first character image is inclined relative to a reference direction, and in response to determining that the direction of the designated edge of the first character image is inclined relative to the reference direction, adjusting an angle of the first character image, so as to make the designated edge of the first character image extend along the reference direction;
    recognizing characters in the J first character images with designated edges all extend along the reference direction, so as to obtain the J target character informations.

6. A terminal device, comprising at least one processor and a memory; the memory being configured to store computer programs; the at least one processor being configured to execute the computer programs stored in the memory, so as to implement the method according to claim 1.

7. A non-transitory computer-readable storage medium storing computer programs, when the computer programs are executed by at least one processor, the method according to claim 1 being implemented.

8. A character recognition method, performing a character recognition based on a character recognition neural network, and the character recognition neural network including a first feature extraction network, a carrier and character detection network, a carrier screening layer, a second feature extraction network, a character detection network, and a character recognition network;

the method comprising:

performing a feature extraction on an image to be recognized by utilizing the first feature extraction network, so as to obtain a first feature map; the image to be recognized including at least one character; and at least one character carrier; the first feature map carrying features of the at least one character carrier and the at least one character;

processing the first feature map by utilizing the carrier and character detection network, so as to at least obtain N first candidate carrier detection boxes; each first candidate carrier detection box being configured to outline a region of a character carrier in the at least one character carrier; N being a positive integer;

screening the N first candidate carrier detection boxes by utilizing the carrier screening layer, so as to obtain K first target carrier detection boxes; K being a positive integer, and K being less than or equal to N;

performing a feature extraction on the first feature map by utilizing the second feature extraction network, so as to obtain a second feature map; the second feature map carrying at least one feature of at least one character;

processing the second feature map by utilizing the character detection network, so as to obtain L first candidate character detection boxes; each first candidate character detection box being configured to outline a region containing at least one character; L being a positive integer;

screening the L first candidate character detection boxes by utilizing the character detection network according to the K first target carrier detection boxes, so as to obtain J first target character detection boxes; J being a positive integer, and J being less than or equal to L; and recognizing characters in the J first target character detection boxes by utilizing the character recognition network, so as to obtain J target character informations.

9. The character recognition method according to claim 8, wherein the character recognition neural network further includes an output layer;

the method further comprises:

according to respective positions of the J first target character detection boxes in the K first target carrier detection boxes, the J target character informations, and respective positions of the K first target carrier detection boxes in the image to be recognized, obtaining K recognition results by utilizing the output layer; each recognition result including target character informations in all first target character detection boxes that are located in a same first target carrier detection box.

10. The character recognition method according to claim 8, wherein processing the first feature map by utilizing the carrier and character detection network, so as to at least obtain the N first candidate carrier detection boxes, includes:

processing the first feature map by utilizing the carrier and character detection network, so as to obtain the N first candidate carrier detection boxes and M first character detection boxes; each first character detection box being configured to outline a region containing at least one character; M being a positive integer;

screening the N first candidate carrier detection boxes by utilizing the carrier screening layer, so as to obtain the K first target carrier detection boxes, includes:

for each first candidate carrier detection box, obtaining first overlap areas of the first candidate carrier detection box and the M first character detection boxes by utilizing the carrier screening layer, so as to obtain M first overlap areas;

if the carrier screening layer judges that at least one of the M first overlap areas is greater than or equal to a preset first overlap area threshold, determining the first candidate carrier detection box as one first target carrier detection box.

11. The character recognition method according to claim 8, wherein screening the L first candidate character detection boxes by utilizing the character detection network according to the K first target carrier detection boxes, so as to obtain the J first target character detection boxes, includes:

for each first candidate character detection box, obtaining second overlap areas of the first candidate character detection box and the K first target carrier detection boxes by utilizing the character detection network, so as to obtain K second overlap areas;

if the character detection network judges that at least one of the K second overlap areas is greater than or equal to a preset second overlap area threshold, determining the first candidate character detection box as one first target character detection box.

12. The character recognition method according to claim 8, wherein the character recognition neural network further includes an angle adjustment network;

the method further comprises:

according to position informations of the J first target character detection boxes, extracting J first target character regions from the image to be recognized by utilizing the angle adjustment network, so as to obtain J first character images;

for each first character image, if the angle adjustment network judges that a direction of a designated edge of the first character image is inclined relative to a reference direction, adjusting an angle of the first character image, so as to make the designated edge of the first character image extend along the reference direction;

recognizing the characters in the J first target character detection boxes by utilizing the character recognition network, so as to obtain the J target character informations, includes: obtaining the J first character images with designated edges all extend along the reference direction from the angle adjustment network by utilizing the character recognition network, and recognizing characters in the J first character images, so as to obtain the J target character informations.

13. The character recognition method according to claim 8, wherein the first feature extraction network and the carrier and character detection network are obtained through following training steps:

inputting a first training sample into a first feature extraction network to be trained;

the first training sample including at least one character and at least one character carrier, and carrying a first label, and the first label including a first carrier labeling information of the at least one character carrier and a first character labeling information of the at least one character;

performing, by the first feature extraction network to be trained, a feature extraction on the first training sample, and determining, by a carrier and character detection network to be trained, a first carrier prediction information of the at least one character carrier and a first character prediction information of the at least one character in the first training sample according to features extracted by the first feature extraction network to be trained;

obtaining a first comparison result of the first carrier prediction information and the first carrier labeling information and a second comparison result of the first character prediction information and the first character labeling information;

adjusting network parameters of the first feature extraction network to be trained and network parameters of the carrier and character detection network to be trained according to the first comparison result and the second comparison result, so as to obtain the first feature extraction network and the carrier and character detection network.

14. The character recognition method according to claim 8, wherein the second feature extraction network and the character detection network are obtained through following training steps:

inputting a second training sample into the first feature extraction network; the second training sample including at least one character, and carrying a second label, and the second label including a second character labeling information of the at least one character;

performing, by the first feature extraction network, a feature extraction on the second training sample, so as to obtain a third feature map;

performing, by a second feature extraction network to be trained, a feature extraction on the third feature map, and determining, by a character detection network to be trained, a second character prediction information of the at least one character in the second training sample according to features extracted by the second feature extraction network to be trained;

obtaining a third comparison result of the second character prediction information and the second character labeling information;

adjusting network parameters of the second feature extraction network to be trained and network parameters of the character detection network to be trained according to the third comparison result, so as to obtain the second feature extraction network and the character detection network.

15. The character recognition method according to claim 8, wherein the character recognition network is obtained through following training steps:

inputting a third training sample into the first feature extraction network; the third training sample including at least one character, and carrying a third label, and the third label including a third character labeling information of the at least one character;

performing, by the first feature extraction network, a feature extraction on the third training sample, so as to obtain a fourth feature map;

performing, by the second feature extraction network, a feature extraction on the fourth feature map, so as to obtain a fifth feature map;

processing, by the character detection network, the fifth feature map to obtain at least one second character detection box of the at least one character; each second character detection box being configured to outline a region containing at least one character;

recognizing, by a character recognition network to be trained, the at least one character in the at least one second character detection box, so as to obtain a third character prediction information;

obtaining a fourth comparison result of the third character prediction information and the third character labeling information;

adjusting network parameters of the character recognition network to be trained according to the fourth comparison result, so as to obtain the character recognition network.

16. The character recognition method according to claim 8, wherein the character recognition neural network is obtained through following training steps:

inputting a fourth training sample into the first feature extraction network; the fourth training sample including at least one character and at least one character carrier, and carrying a fourth label, and the fourth label including a second carrier labeling information of the at least one character carrier and a fourth character labeling information of the at least one character;

performing, by the first feature extraction network, a feature extraction on the fourth training sample, so as to obtain a sixth feature map; the sixth feature map carrying features of the at least one character carrier and the at least one character;

processing, by the carrier and character detection network, the sixth feature map, so as to at least obtain n second candidate carrier detection boxes, each second candidate carrier detection box being configured to outline a region of a character carrier in the at least one character carrier, and n being a positive integer; and determining, by the carrier and character detection network, a second carrier prediction information of the character carrier;

screening, by the carrier screening layer, the n second candidate carrier detection boxes, so as to obtain t second target carrier detection boxes; t being a positive integer, and t being less than or equal to n;

performing, by the second feature extraction network, a feature extraction on the sixth feature map to obtain a seventh feature map; the seventh feature map carrying at least one feature of at least one character;

processing, by the character detection network, the seventh feature map to obtain p second candidate character detection boxes; each second candidate character detection box being configured to outline a region containing at least one character; p being a positive integer;

screening, by the character detection network, the p second candidate character detection boxes according to the t second target carrier detection boxes, so as to obtain j second target character detection boxes; j being a positive integer, and j being less than or equal to p;

recognizing, by the character recognition network, characters in the j second target character detection boxes, so as to obtain a fourth character prediction information;

obtaining a fifth comparison result of the second carrier prediction information and the second carrier labeling information, and a sixth comparison result of the fourth character prediction information and the fourth character labeling information;

adjusting network parameters of a character recognition neural network to be trained according to the fifth comparison result and the sixth comparison result, so as to obtain the character recognition neural network.

17. A terminal device, comprising at least one processor and a memory; the memory being configured to store program instructions of a character recognition neural network; the at least one processor being configured to execute the program instructions stored in the memory, so as to implement the method according to claim 8.

18. A non-transitory computer-readable storage medium storing program instructions of a character recognition neural network, when the program instructions are executed by at least one processor, the method according to claim 8 being implemented.

\* \* \* \* \*